(12) United States Patent
Degtyarev et al.

(10) Patent No.: US 10,762,692 B2
(45) Date of Patent: *Sep. 1, 2020

(54) TECHNIQUES FOR PROVIDING VIRTUAL LIGHTING ADJUSTMENTS UTILIZING REGRESSION ANALYSIS AND FUNCTIONAL LIGHTMAPS

(71) Applicant: Apple Inc., Cupertino, CA (US)

(72) Inventors: Yury Degtyarev, Cupertino, CA (US); Frederic Cao, Santa Clara, CA (US); Garrett M. Johnson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,335

(22) Filed: Sep. 6, 2019

(65) Prior Publication Data

US 2020/0082607 A1 Mar. 12, 2020

Related U.S. Application Data

(63) Continuation of application No. 16/128,295, filed on Sep. 11, 2018, now Pat. No. 10,467,803.

(51) Int. Cl.
*G06T 15/50* (2011.01)
*G06T 15/04* (2011.01)
(Continued)

(52) U.S. Cl.
CPC .............. *G06T 15/50* (2013.01); *G06T 5/002* (2013.01); *G06T 15/04* (2013.01); *G06T 17/20* (2013.01);
(Continued)

(58) Field of Classification Search
None
See application file for complete search history.

(56) References Cited

U.S. PATENT DOCUMENTS

2006/0204034 A1 9/2006 Steinberg et al.
2009/0247997 A1 10/2009 Watanabe et al.
(Continued)

FOREIGN PATENT DOCUMENTS

| CN | 106780359 | 5/2017 |
|---|---|---|
| JP | 2012178191 | 9/2012 |
| JP | 2013172166 | 9/2013 |

OTHER PUBLICATIONS

Cai et al. ("Learning a Deep Single Image Contrast Enhancer from Multi-Exposure Images", IEEE, 2018) (Year: 2018).*

(Continued)

*Primary Examiner* — Nicholas R Wilson
(74) *Attorney, Agent, or Firm* — Blank Rome LLP

(57) ABSTRACT

Embodiments of the present disclosure can provide systems, methods, and computer-readable medium for providing virtual lighting adjustments to image data. A number of source images may be generated to individually depict solid colors of a color space (e.g., RGB color space). Virtual lighting adjustments associated with a virtual lighting mode may be applied to each source image to generate a corresponding target image. The source images and the target images may be utilized to train a model to identify pixel modifications to be applied to image data. The modifications may be associated with a virtual lighting mode. Subsequently, a user may obtain image data (e.g., an image or video) select a virtual lighting mode via an image data processing application. The previously trained model may be utilized to modify the image to apply the virtual lighting effects associated with the selected virtual lighting mode.

18 Claims, 13 Drawing Sheets

(51) Int. Cl.
    *G06T 17/20*      (2006.01)
    *G06T 5/00*       (2006.01)
    *G06F 3/0482*     (2013.01)

(52) U.S. Cl.
    CPC ........ *G06F 3/0482* (2013.01); *G06T 2200/24* (2013.01); *G06T 2207/10016* (2013.01); *G06T 2207/30201* (2013.01)

(56) References Cited

U.S. PATENT DOCUMENTS

| | | |
|---|---|---|
| 2011/0013829 A1 | 1/2011 | Kim |
| 2011/0103655 A1 | 5/2011 | Young et al. |
| 2017/0243396 A1 | 8/2017 | Kim et al. |
| 2018/0174586 A1 | 6/2018 | Esquivel et al. |
| 2019/0087726 A1* | 3/2019 | Greenblatt ............... G06N 3/08 |

OTHER PUBLICATIONS

Gardner et al. ("Learning to Predict Indoor Illumination from a Single Image", 2017) (Year: 2017).*

U.S. Appl. No. 16/128,295, "Notice of Allowance", dated Jun. 27, 2019, 10 pages.

\* cited by examiner

TECHNIQUES FOR PROVIDING VIRTUAL LIGHTING ADJUSTMENTS UTILIZING REGRESSION ANALYSIS AND FUNCTIONAL LIGHTMAPS

CROSS-REFERENCES TO RELATED APPLICATIONS

This application is a continuation of U.S. patent application Ser. No. 16/128,295, filed Sep. 11, 2018, which is incorporated by reference.

This application is related to U.S. patent application Ser. No. 16/032,418 filed Jul. 11, 2018, entitled "Techniques for Providing Virtual Light Adjustments to Image Data," the disclosure of which is incorporated by reference herein in its entirety for all purposes.

BACKGROUND

It has become more commonplace for people to take photos during the course of their daily lives. Many personal devices (e.g., smartphones, wearable devices, tablets, etc.) now include a digital camera, making picture taking an easily accessible activity. Standalone digital cameras have continued to be popular. Social media has spurned an increased interest in sharing experiences through images as users often post photographs of themselves or loved ones to their social group. The digital cameras provided on most personal devices are not necessarily as robust as professional photography equipment. Additionally, some professional equipment may be bulky and difficult to transport. Although personal devices and standalone digital cameras may include many advanced features, the user may lack the experience or training to effectively utilize such features. Regardless of the medium used, it can often be the case that the image captured by a user lacks qualities found in professional photographs. To obtain professional quality photographs, one often must visit a studio or meet with a professional photographer. This can be inconvenient, or even cost-prohibitive, for many users.

SUMMARY

Embodiments of the present disclosure can provide systems, methods, and computer-readable medium for providing virtual lighting adjustments to image data (e.g., one or more digital photos, video data including one or more video frames, etc.) in real time. In some examples, a computing device (e.g., a laptop, a mobile phone or other portable, handheld device) may be used to present user interfaces that enable the application of various virtual lights to the image data. A model may be pre-generated that identifies pixel modifications to be made to the image data based on a selected virtual lighting mode (also referred to herein as a "lighting mode"). The image data (e.g., of the image and/or video) may then be modified in real time using the model to apply lighting techniques. The image and/or video being adjusted may have been previously stored on a storage device and processed based at least in part on request (e.g., a request submitted via a user device), or the image/video may be saved in transient memory and processed via live streaming without subsequent storage. The modifications may produce a professional looking image and/or video without the cost or inconvenience of seeking out a professional photographer's and/or videographer's help.

Although examples herein may be directed to an image for brevity, it should be appreciated that the same techniques may be applied to modify multiple images. Any example provided herein that is directed to an image may be similarly utilized to perform the disclosed lighting adjustments to a video (e.g., one or more video frames). "Real time," or "real time processing" may refer to processing conducted in response to a request (e.g., a request submitted by a user device), where the processing is short enough such that the effect of the processing substantially immediately. "Real time" may also refer to processing on the fly at a cadence of sensor acquisition, whether it be in the form of a live preview, during a video recording, etc. By way of example, a preview of an image may be provided in some examples discussed herein. It should be appreciated that the preview may present the lighting adjustments discussed herein substantially immediately (in real time) upon a user selecting a particular lighting mode for a particular image. Similarly, a video may be modified in real time (e.g., as the video is played) to present the lighting adjustments to one or more frames of the video. The image and/or video may be stored on the user device prior to application of the virtual lighting techniques discussed herein, and/or the image and/or video may be stored as adjusted subsequent to the application of the virtual lighting techniques discussed herein.

In some embodiments, a computer-implemented method is disclosed for providing virtual light adjustments to image data (e.g., one or more images, one or more video frames of a video, etc.). The method may comprise obtaining first image data depicting a first subject (e.g., at least a portion of a person). The method may further comprise identifying a set of landmark points from the first image data. The method may further comprise generating a plurality of source images, each corresponding to a color of a plurality of colors. The method may further comprise generating a plurality of target images corresponding to each of the plurality of source images. In some embodiments, the plurality of target images may be generated by performing lighting adjustments associated with a virtual lighting mode to each of the plurality of source images. In some embodiments, the lighting adjustments may be performed utilizing the set of landmark points. The method may further comprise transforming the plurality of source/target images from screen space to 2-dimensional texture space. The method may further comprise generating a model using a regression analysis technique and the plurality of source/target images transformed in 2-dimensional texture space. The method may further comprise obtaining second image data depicting a second subject. The method may further comprise displaying, on a user interface of the device, a plurality of selectable options for selecting one of the plurality of virtual lighting modes. The method may further comprise receiving user input indicating selection of one of the plurality of selectable options. The method may further comprise modifying the second image data in real time based at least in part on the model and the user input indicating selection of one of the plurality of virtual lighting modes. The method may further comprise presenting, on a display of the device, the second image data as modified in real time.

In some embodiments, identifying a plurality of landmark points from first headshot image data (e.g., image data corresponding to a facial area of the subject) of the first image data, determining one or more areas of the first headshot image data based at least in part on the set of landmark points and the virtual lighting mode selected, and modifying each of the plurality of source images by applying virtual lighting adjustments according to the one or more areas determined from the first headshot image data.

In some embodiments, the method may further comprise displaying, at a user interface, a preview of the second image data as modified in real time, obtaining (e.g., during the preview) subsequent image data related to the second image data, and modifying the subsequent image data based at least in part on the model and the virtual lighting mode to be applied.

In some embodiments, modifying the second image data in real time based at least in part on the model may further comprise a set of operations. The set of operations may include generating a coordinate mapping texture based in part on the second image data and a 3D mesh for the second image data. The operations may further include transforming pixel coordinates of the second image data from screen space to 2-dimensional texture space utilizing the coordinate mapping texture. The operations may further include providing, as input into the model, pixel attributes and texel coordinates for a plurality of pixels of the second image data. The operations may further include receiving, as output from the model, adjusted pixel attributes for individual pixels of the plurality of pixels of the second image data. The set of operations may further include receiving, as output from the model, adjusted pixel attributes for individual pixels of the plurality of pixels of the second image data. The set of operations may further include changing the second image data in screen space based at least in part on the adjusted pixel attributes. In some embodiments, the pixel attributes may include at least one of a red color channel, a green color channel, or a blue color channel.

In some embodiments modifying the second image data may include modifying one or more pixel characteristics of at least one set of pixels of the second image data. Modifying the one or more pixel characteristics may modify at least one of: a perceived brightness, hue, or saturation of the second image data.

In some embodiments, a system is disclosed for providing virtual light adjustments to image data. The system may comprise a first computing device and a second computing device, the first computing device and the second computing device individually comprising one or more memories configured to store computer-executable instructions and one or more processors configured to execute the computer-executable instructions to perform operations. In some embodiments, the operations may comprise obtaining, by a first computing device, a plurality of landmark points from headshot image data of a subject image. The operations may further comprise generating, by the first computing device, a plurality of source images each corresponding to a color of a plurality of colors. In some embodiments, each of the plurality of colors are associated with an RGB sample of an RGB color space. The operations may further comprise generating, by the first computing device, a plurality of target images by applying lighting adjustments to each of the plurality of source images. In some embodiments, the lighting adjustments may be applied based at least in part on the plurality of landmark points. In some embodiments, the lighting adjustments may be associated with a virtual lighting mode of a plurality of virtual lighting modes. The operations may further comprise transforming, by the first computing device, the plurality of source/target images from screen space to 2-dimensional texture space. The operations may further comprise generating, by the first computing device, a model based at least in part on the plurality of source images and the plurality of target images transformed to 2-dimensional texture space. The operations may further comprise storing the model generated by the first computing device at a second computing device. In some embodiments, the storing of the model at the second computing device may configure the second computing device to apply the lighting adjustments associated with the virtual lighting mode to subsequent image data.

In some embodiments, the model is generated utilizing multivariate regression techniques to identify a plurality of sets of coefficients, each set of coefficients being associated with a color channel of a plurality of color channels and a pixel in 2D texture space. In some embodiments, each of the sets of coefficients may comprise a plurality of coefficients. In some embodiments, a first channel of the plurality of respective channels corresponds to a red channel, a second channel of the plurality of respective channels corresponds to a green channel, and a third channel of the plurality of respective channels corresponds to a blue channel.

In some embodiments, the model is trained to identify modifications to individual pixels of input image data provided in 2D texture space. In some embodiments, applying the modifications identified by the model causes one or more virtual lighting effects associated with the virtual lighting mode to be applied to the input image data.

In some embodiments, a computer-readable storage medium is disclosed. The computer-readable storage medium may store computer-executable instructions that, when executed by one or more processors, configure the one or more processors to perform various operations. The operations may comprise obtaining a model associated with a virtual lighting mode, the model being previously trained to identify pixel adjustments to apply lighting modifications associated with the virtual lighting mode. The operations may further comprise receiving, at a user interface, user input indicating selection of an option associated with the virtual lighting mode. The operations may further comprise obtaining image data to be modified, the image data depicting at least a portion of a subject. The operations may further comprise generating a coordinate mapping texture based at least in part on the second image data and a 3D mesh for the second image data. The operations may further comprise transforming pixel coordinates of the image data from screen space to 2-dimensional texture space utilizing the coordinate mapping texture. The operations may further comprise generating a modified version of the image data based at least in part on the model and the pixel coordinates transformed to 2-dimensional texture space. In some embodiments, the modified version presents lighting modifications to the image data. In some embodiments, the lighting modifications being associated with the virtual lighting mode selected. The operations may further comprise presenting, at the user interface, the modified version of the image data.

In some embodiments, the virtual lighting mode is one of a plurality of virtual lighting modes, wherein the model is one of a plurality of models stored at the computer-readable storage medium. In some embodiments, each model of the plurality of models corresponds to a particular virtual lighting mode of the plurality of virtual lighting modes.

In some embodiments, the operations may further comprise modifying the image data by executing at least one contrast reduction algorithm, wherein executing the contrast reduction algorithm causes image noise to be reduced within the captured image, and wherein the at least one contrast reduction algorithm comprises at least one of: a Gaussian mask, a smoothing filter, a linear filter, a non-linear filter, or a median filter.

In some embodiments, generating the modified version of the captured image comprises increasing or decreasing at least one characteristic (e.g., at least one of perceived brightness, hue, saturation, etc.) of at least one pixel of the image data according to output provided from the model associated with the virtual lighting mode.

In some embodiments, the modified version of the captured image may presented as a preview within a preview window of the user interface. The operations may further comprise receiving subsequent image data associated with the image data, the image data and subsequent image data corresponding to frames of a video. The operations may further comprise generating modified versions of the subsequent image data utilizing the model, the subsequent image data being modified to apply the lighting modifications associated with the virtual lighting mode. The operations may further comprise presenting the modified versions of the subsequent image data in real time within the preview window of the user interface.

In some embodiments, generating the modified version of the image data based at least in part on the model and the pixel coordinates transformed to 2-dimensional texture space may comprise further operations. The further operations may comprise providing, as coordinate input into the model, texel coordinates for a plurality of pixels of the second image data. The further operations may comprise providing, as color input into the model, pixel attributes for a plurality of pixels of the second image data. The further operations may comprise receiving, as output from the model, adjusted pixel attributes for individual pixels of the plurality of pixels of the image data. The further operations may comprise changing the image data in screen space based at least in part on the adjusted pixel attributes.

The following detailed description together with the accompanying drawings will provide a better understanding of the nature and advantages of the present disclosure.

DETAILED DESCRIPTION

Figure 1:
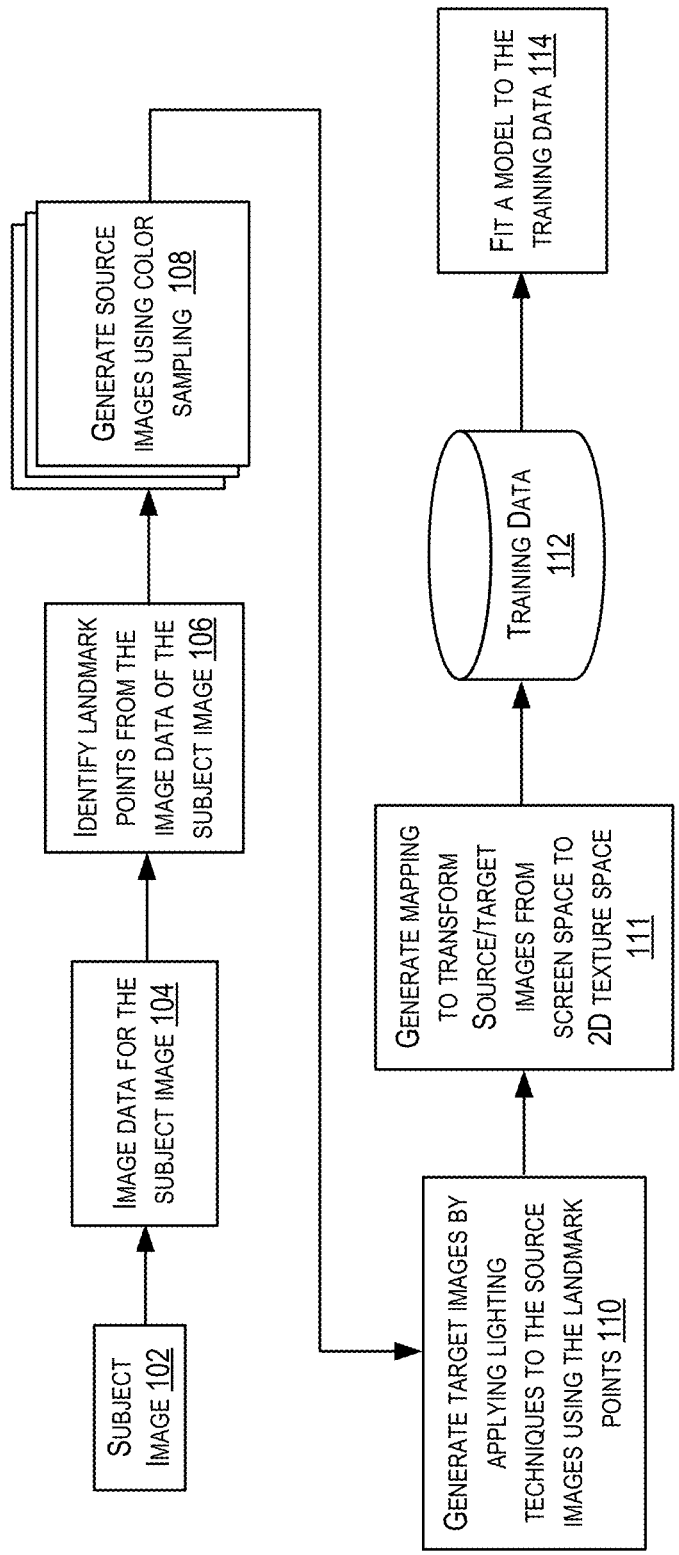
FIG. 1 is a simplified block diagram illustrating an example process for generating a model that identifies image data modifications for providing virtual lighting adjustments to an image, according to at least one embodiment.

Certain embodiments of the present disclosure relate to devices, computer-readable medium, user interfaces, and methods for modifying image data to provide virtual lighting adjustments. "Image data" is intended to refer to any suitable information related to a digital image and/or video (e.g., RGB values, depth measurement values, texture data, 2-dimensional (2D) image data, video data, etc.). Although examples herein utilize image data that may include RGB color values, it should be appreciated that other color spaces may be similarly utilized (e.g., YUV, HSV, perceptually uniform color spaces such as L*a*b*, CAM02-UCS and/or CAM16-UCS, or any suitable linear mapping of the image data RGB values to an optimally selected color space basis). In some examples, image data may include "headshot image data" that is related to a subject of the image, such as a portion of the image depicting a headshot (e.g., an area of the face and/or an area within some distance of the face such as the subject's neck, shoulders, chest, etc.) of the subject. Although examples herein may be provided in the context of digital image(s)/video(s) that include an image/video frame including a single subject (e.g., a person or a portion of a person), it should be appreciated that digital image(s)/video(s) that include more than one subject may be similarly modified using the techniques described below. For brevity, examples herein may utilize a digital image (e.g., an "image"). However, it should be appreciated that any example provided herein may equally be applied to perform virtual lighting adjustments to a video. Accordingly, the term "image" may refer to a digital image and/or one or more image frames of a video.

In some embodiments, one or more models (e.g., a mathematical model) may be generated to identify virtual lighting adjustments to be made to image data of a digital image or a video frame. Each model may be trained to identify pixel adjustments to be made for a particular virtual lighting mode. In some embodiments, a number of virtual lighting modes may be utilized. Each lighting mode may correspond to particular increases or reductions of one or more pixel characteristics (e.g., the perceived brightness, hue, and/or saturation) for pixels within the image data according to a predefined scheme. In other words, each virtual lighting mode may be associated with particular areas (or an area) of the subject and a particular manner by which the pixel characteristic(s) (e.g., perceived brightness, hue, and/or saturation) of the pixels within those area(s) are to be modified. For example, a set of lighting modes may include a contour mode, a studio mode, a stage mode, and a stage light mono mode. A contour mode may be utilized to produce a modified image that, at least in part, increases brightness toward the front of the face and darkens the side(s) of the face. A studio mode may be utilized to generally brighten the face and highlight the side(s) of the face. In examples in which a face isn't detect, the foreground of the image may be brightened in studio mode. A stage mode may at least depict the subject as emerging from a darkened background. In some examples, a stage light mono mode may be provided that depicts the subject in black and white and emerging from a darkened background. In either the stage mode or the stage light mono mode, the background of the image may be darkened (or blacked out), even if no facial features are detected. It should be appreciated that the lighting modes described herein are illustrative in nature and that other virtual lighting modes that provide different lighting adjustments are contemplated.

A model may be pre-generated for each virtual lighting mode. By way of example, a model (e.g., a mathematical model) for identifying lighting mode adjustments for a contour mode may be generated. During a process performed to train a particular model, a subject image may be obtained. A "subject image" may depict a subject (e.g., at least a portion of a person). Landmarks points corresponding to the subject may be identified from the subject image. In some embodiments, a "landmark point" corresponds to a particular location/portion of the subject within an image. Any suitable number of landmark points may be identified within the subject image based at least in part on analyzing depth measurement values and/or color space values (e.g., RGB values) of the image data of the subject image. A set of landmark points may define a particular area of the image corresponding to a headshot of the subject. By way of example, one set of landmark points may define an outline of the subject's head, while another set of landmark points may define an area corresponding to the subject's eyebrow(s), mouth, eye(s), nose, teeth, or the like.

A number of colored source images corresponding to respective colors (e.g., RGB samples) of a color space (e.g., the RGB color space) may be generated. These colored source images may be provided in screen space. "Screen space," as used herein is intended to refer to image data (2D data that depicts 3D qualities) as stored or seen projected by a capture device such as a camera or video recorder onto a sensor plane of the device. The colored source images may conform to an RGB color space or the source images may conform to a different color space. In some embodiments, a number of sampling strategies may be employed. For example, when utilizing RGB samples, the uniformity of distribution of the RGB samples along the Y' (Luma) axis may be prioritized (e.g., when samples are transformed to the Y'UV color space). Each of the colored source images may be filled with a single solid color of the color space (e.g., a particular RGB color sample, or another particular color should a different color space be employed).

The landmark points previously identified from the subject image may be utilized to apply a number of lighting techniques corresponding to the contour mode to each of the colored source images. Techniques for applying these lighting techniques are discussed in further detail in U.S. patent application Ser. No. 16/032,418 filed Jul. 11, 2018, entitled "Techniques for Providing Virtual Light Adjustments to Image Data," the disclosure of which is incorporated by reference herein in its entirety for all purposes. Generally, application of these lighting techniques may modify areas of each of the source images to adjust perceived brightness, hue, and/or saturation of the pixels in the source image. Said another way, the landmark points may be utilized to adjust a perceived brightness, a hue, and/or a saturation of the pixels of a particular colored source images to generate a corresponding target image. A target image may be generated (e.g., in screen space) for each of the colored source images utilizing those landmark points. The generated source/target images may then be mapped to 2D texture space and utilized as training data to train the model. An image may be represented in 2D texture space utilizing a two-dimensional array of any suitable size (e.g., a 64 by 64 indexed array and/or grid). To map (e.g., transform) the source/target images to 2D texture space, a 3D polygon mesh may be fit to the facial area within the first image. Texture coordinates may be assigned to the 3D polygon mesh's vertices. Using the texture coordinates and the 3D polygon mesh, the screen space image data may be mapped to 2D texture space data. The source/target images (transformed/mapped to 2D texture space) may be utilized as training data to train the model. The source image (whether in screen space or in 2D texture space) representation and storage may be implicit and consist of a single color (in the chosen color space).

The source images (or at least the RGB values associated with the source image) and the target images transformed/mapped to 2D texture space may be utilized to train a model. The model, in general, may be a multivariate vector-valued function of 5 variables: texture coordinates (s, t) and color value (R, G, B). It should be appreciated that texture coordinates are usually denoted as (u, v) in Computer Graphics (e.g., UV mapping, UV unwrapping), but are denoted as (s, t) in the examples herein to distinguish them from color coordinates of the YUV color space. The model's texture space may be discretized, so s and t may take integer values and for a given fixed texel (s, t) of discretized texture space (a pixel in 2D discretized texture space), the model for that texel may become a function of 3 variables: R, G, B. The model may include any suitable number of parameterized function formulas corresponding to each texel of the discretized 2D texture space. Each formula may be generated to take an input RGB value of a particular pixel corresponding to a particular coordinate in 2D texture space and output an adjusted RGB value for that pixel. Thus, the model may be trained (i.e., model's parameters may be learned) to estimate the adjustment to be made to any given pixel in order to apply substantially the same lighting techniques as those applied to the source images in order to generate the target images. In some embodiments, the model may include any suitable number of functional lightmaps (e.g., similar to the polynomial lightmaps 402-408 of FIG. 4) which individually correspond to the parameters of the function formulas—to coefficient indices of a particular functional basis term of the model, arranged on a 2D grid of discretized texture space. A suitable function space and function basis may be pre-selected (via another optimization) to optimally represent/encode the light adjustments, in order to reduce the number of coefficients of the model. In some embodiments, instead of using (default) RGB color space for model training, any custom color space can be used (e.g., YUV, L*a*b*, HSV, linearly mapped RGB). In this case, source and target images colors may be transformed to that color space before the model is trained and model's input variables related to 3 color components (R, G, B in the default case, described above), may be reinterpreted to represent color values of that custom color space. In some embodiments, the custom color space may be pre-selected (via another optimization) to optimally represent/encode the light adjustments, in order to reduce the number of coefficients of the model.

The model (e.g., the parameterized function formulas and their respective coefficients stored in functional lightmaps) may be provided to a user device. Subsequently, the user may adjust an image and/or a frame of a video to apply lighting adjustments associated with a particular lighting mode utilizing the model. The image data corresponding to the image/frame of the video may initially be in screen space. The pixel coordinates of the image data may then be mapped/transformed to 2D texture space in a similar manner as described above. The RGB values for each pixel and the transformed pixel coordinates may be provided to the model as input in order to obtain an adjusted pixel value. The adjusted pixels value may be utilized to adjust the image data to apply the lighting adjustments for the particular lighting mode.

As a non-limiting example, a user's device may be configured with an image and/or video processing application that enables the user to obtain an image/video through capture (e.g., utilizing one or more cameras of the user device) or the image/video may be previously stored and retrieved from memory accessible to the user device. Once an image/video is obtained, the user may preview the image/video and select from a variety of virtual lighting modes. In some embodiments, the user may select a virtual lighting mode prior to capture/retrieval time, such that an image/video captured and/or retrieved may be modified in accordance with virtual lighting mode previously selected. By way of example, a user may use a personal computing device with image capture functionality/hardware (e.g., a smartphone, wearable device, laptop, etc.) to capture an image. The captured image can include headshot image data corresponding to any suitable number of subjects within the image. The captured image may be in screen space. A preview of the captured image can be displayed on a screen of the user's personal device. In some examples, a smoothing technique (e.g., a noise reduction algorithm) may be applied to the image to reduce image noise produced during capture. In some embodiments, a "fill" light may be applied to the subject(s) in the image (e.g., the face(s) of the subject(s)) to smooth out shadows and uneven illumination. The skin-tone of the subject(s) may be maintained to provide lighting adjustments without washing out the image. This may have the effect of providing a more realistic modification that closely resembles lighting adjustments physically performed by a professional photographer. A user interface may be provided that allows the user to select one of the various lighting modes (e.g., contour, studio, stage, etc.) with which to modify the previewed image.

In some embodiments, upon receiving user selection of a particular lighting mode (e.g., via a selection of an option associated with the particular lighting mode), the application may be configured to utilize a stored model (e.g., a model previously generated in the manner described above) corresponding to the selected lighting mode. It should be appreciated that the lighting mode could be selected prior to capture. By way of example, given a selection of a "contour mode," a previously-trained model corresponding to the "contour mode" may be obtained from local memory. The application may map a pixel coordinate (x, y) of the captured image from screen space to (s, t) in 2D texture space, in order to provide texture coordinate input to the model. This step may be performed by using a coordinate mapping texture, generation of which was described further below. Each color value for each pixel of the image data may be provided as color input to the model. The model may provide the adjusted color value for each pixel as output and the pixel may be adjusted in the image data in screen space according to the output. Once complete, each pixel of the image data in screen space may be modified to provide virtual lighting adjustments associated with the virtual lighting mode. It should be appreciated that in some embodiments, every pixel of the image data may not be utilized as input in the model. Rather, in some embodiments, only pixels corresponding to the headshot of the subject of the image may be utilized as input. The adjustments identified by the model may be substantially the same adjustments that would be made were the captured image modified utilizing landmark points, areas associated with the landmark points, and one or more masks, and the virtual lighting adjustment techniques described above. It should be appreciated that if the image data corresponds to a different color space than the color space used to train the model, the image data may be transformed to the same color space used to train the model prior to input. Similarly, output of the model may be transformed back to the color space of the image data prior to an adjustment being made to the image data.

The techniques described herein have a number of technical advantages. For example, by pre-generating a model to identify lighting mode adjustments, lighting mode adjustments may be more efficiently applied to image data (e.g., an image or video frame) enabling the image data to be adjusted in real time. Techniques for applying lighting mode adjustments including determining landmark points, areas associated with the landmark points, generating one or more masks, and the like, are discussed in further detail in U.S. patent application Ser. No. 16/032,418 filed Jul. 11, 2018, entitled "Techniques for Providing Virtual Light Adjustments to Image Data," the disclosure of which is incorporated by reference herein in its entirety for all purposes. The techniques discussed in U.S. patent application Ser. No. 16/032,418 may be computational extensive. By utilizing the techniques discussed herein, including generating a model trained to identify an adjusted pixel values from input pixel values (e.g., RGB values for each pixel of the unmodified image data), substantially the same lighting adjustments may be performed at real-time or at least at a reduced computational time. This may reduce the delay between virtual lighting selection and presentation of the image data modified to apply the virtual lighting adjustments such that these virtual lighting adjustments may be made in real time.

The techniques described above are discussed in further detail below with respect to the following figures.

FIG. 1 is a simplified block diagram illustrating an example process 100 for generating a model that identifies image data modifications for providing virtual lighting adjustments to an image, according to at least one embodiment.

To generate a model for a particular lighting mode (e.g., a contour mode), subject image 102 may be obtained. The subject image 102 may include image data 104. Image data 104 may be extracted from the subject image 102 and analyzed to identify the headshot image data (e.g., corresponding to an area within, and/or around, a subject's face).

At 106, landmark points may be identified from the image data. In some embodiments, the landmark points correspond to particular locations/portions of the subject. Any suitable number of landmark points may be obtained using the image data (or potentially a portion of the image data such as the headshot image data) based at least in part on analyzing depth measurement values and/or color space values (RGB values) of the image data (or headshot image data). In some embodiments, a set of landmark points may define a particular area of the headshot of the subject. By way of example, one set of landmark points may define an outline of the subject's head, while another set of landmark points may define an area corresponding to the subject's eyebrow(s), mouth, eye(s), nose, teeth, or the like. In some embodiments, the landmark points may be stored for later processing.

At 108, a number of source images may be generated. These source images may be generated to individually represent particular colors of the RGB color cube (or particular colors of another color space, should another color space be utilized). In some embodiments, the source images may each be filled with a solid color of the RGB color cube. Any number of source images may be generated. By way of example, 1000 source images may be generated to represent 1000 different RGB value samples. In some embodiments, one source image may correspond to the particular RGB components corresponding to the color magenta. Another target image may correspond to the particular RGB components corresponding to the color sky blue. As described above, a number of sampling strategies may be employed. For example, when utilizing RGB samples, the uniformity of distribution of the RGB samples along the Y' (Luma) axis may be prioritized (e.g., when samples are transformed to the Y'UV color space).

At 110, the target images corresponding to the source images may be generated. Initially, the target images may be in screen space. A target image corresponding to a source image may be generated by applying lighting adjustments corresponding to a particular virtual lighting mode (e.g., contour mode) to a source image. Both the unaltered source image and a corresponding target image may be stored for later processing. In some embodiments, the RGB values corresponding to the source images may be stored rather than the whole source image. To apply the lighting adjustments, the set of landmark points identified at 106 from the subject image may be retrieved. As described in U.S. patent application Ser. No. 16/032,418 filed Jul. 11, 2018, entitled "Techniques for Providing Virtual Light Adjustments to Image Data," a number of masks (e.g., one or more) may be generated from these landmark points. These masks may be generated depending on the area of the image such that localized lighting modifications can be made to a source image to generate a corresponding target image. In some examples, a mask may include an outline of the subject's head but exclude areas corresponding to the subject's eyes, eyebrows, nose, mouth, teeth, or the like. Accordingly, in some embodiments, a mask may define portions of the headshot of the subject (e.g., face, décolletage, shoulders, neck, forehead, chin, cheeks, nose, eyes, or any suitable portion of the subject). The mask(s) may be utilized to modify each of the target images to apply lighting adjustments associated with the virtual lighting mode (e.g., the contour mode) according to a predefined scheme associated with the virtual lighting mode.

At 111, a mapping may be generated to map the target images from screen space to 2D texture space. By way of example, a 3D polygon mesh (e.g., the 3D mesh 200 described in FIG. 2) may be fit to the facial area of a first image. Texture coordinates (e.g., visualized by rendering mesh in screen-space with applied checkerboard texture pattern depicted at 210 of FIG. 2) may be determined and assigned to the 3D polygon mesh's vertices, such that the mesh vertices' 3D coordinates may be mapped from 3D space to 2D texture space, in order for a 3D point of a subject's surface to be mapped to the 2D texture space via interpolation. The texture coordinates of 3D polygonal mesh may be rendered (projected with interpolation similarly to that depicted at 210 of FIG. 2, but may apply black-to-red gradient for s-coordinate and black-to-green gradient for t-coordinate, for example, instead of checkerboard pattern) in screen space to produce a coordinate mapping texture, such that the source/target images may be mapped from screen space to the (s, t) texture coordinates of the 2D texture space. FIG. 3 further illustrates example target images as represented in 2D texture space. The source/target images mapped to 2D texture space may be stored as training data 112. In some embodiments, training data 112 may include any suitable number of pairs of images where each pair includes an unaltered source image and its corresponding target image as represented in 2D texture space. In other embodiments, the training data 112 may include the RGB values corresponding to each source image as well as the target images in 2D texture space. The training data 112 may be stored for later processing in any suitable storage location.

At 114, a model may be fit to the training data 112 using a regression analysis technique (e.g., a multivariate regression technique). In some embodiments, the model may include multiple parameterized functions formulas, each function may correspond to a particular texel coordinates (s, t) in a discretized 2D texture space. For a given fixed texture coordinate (s, t), and for a given output color channel, the parameterized function formula may be a non-linear function of N-th degree multivariate polynomial, or a non-linear function of a linear combination of optimally selected basis functions in a selected function space. For example, the model may include a function for determining an output value for a red channel of a particular texel (s, t) utilizing the following:

$$R_{out}\left(s, t, \begin{pmatrix} R \\ G \\ B \end{pmatrix}\right) = \max\left(0, \min\left(1, \sum_{m+n+p \leq 2} c_{m,n,p}(s,t) R^m G^n B^p\right)\right)$$

As shown above, this function is a function of 5 variables, however, when s and t are fixed, a function for texel (s, t) may be determined as a function of the three variables R, G, and B. Thus, the function above is an example of a three-variable multivariate polynomial of N-th degree (quadratic multivariate polynomial in the given example).

The regression analysis techniques utilized herein may determine a fit using the method of non-linear least squares. A non-linear least-squares method may optimize a selected cost function with a metric, which could be (but is not restricted to) a Euclidean distance in the model color space, a Euclidean distance of transformed color points in a selected metrical color space (e.g., class of Perceptually Uniform Color Spaces), or could utilize any color difference formulas between points in the model color space (e.g., any of CIELAB $\Delta E^*$). The cost function may include a regularization term. The color space (e.g., RGB color space) utilized to train the model may be pre-selected (or pre-transformed using some linear mapping to an optimally selected color space basis) to optimally represent the target function with the least number of coefficients possible. As part of the fitting process, a number of coefficients may be identified for the model. In some embodiments, the model may utilize any suitable number of coefficients.

It should be appreciated that any suitable number of coefficients may be utilized. As a non-limiting example, ten coefficients for each color channel (e.g., red, green, blue for RGB color space) may be utilized. In examples which utilize the RGB colors space, with ten coefficients for each color channel (e.g., R, G, and B), the model may include a total of thirty coefficients for a given texel coordinate (s, t) in 2D texture space. For a texture space that represents image data in a 64×64 map, the model may include 64×64×30 coefficients. Each coefficient ($C_{m,n,p}$) may be represented as a 2D map plotting coefficient ($C_{m,n,p}$) for each pixel (s, t). This map may be referred to as a "functional lightmap" or in the case of polynomial function basis, as a "polynomial lightmap." Example functional lightmaps (e.g., polynomial lightmaps 402-408) are provided in reference to FIG. 4. Continuing with the current example, for 30 coefficients (10 for each color channel R, G, and B), 30 coefficients may be identified (e.g., corresponding to 30 polynomial lightmaps). Each of the 10 coefficients (represented by a functional lightmap) may be utilized to identify values for a particular texel (s, t) in 2D texture space for the particular color channel to which the 10 coefficients relate. In this manner, the model may be configured to take as input an input RGB value (e.g., corresponding to a pixel of image data with pixel coordinates mapped to 2D texture space), and provide an output RGB value (corresponding to the same pixel coordinate). The model (e.g., the parameterized function formulas and the corresponding parameters-coefficients arranged in functional lightmaps) may be stored at a server computer and/or at a user's device for later utilization.

Figure 2:
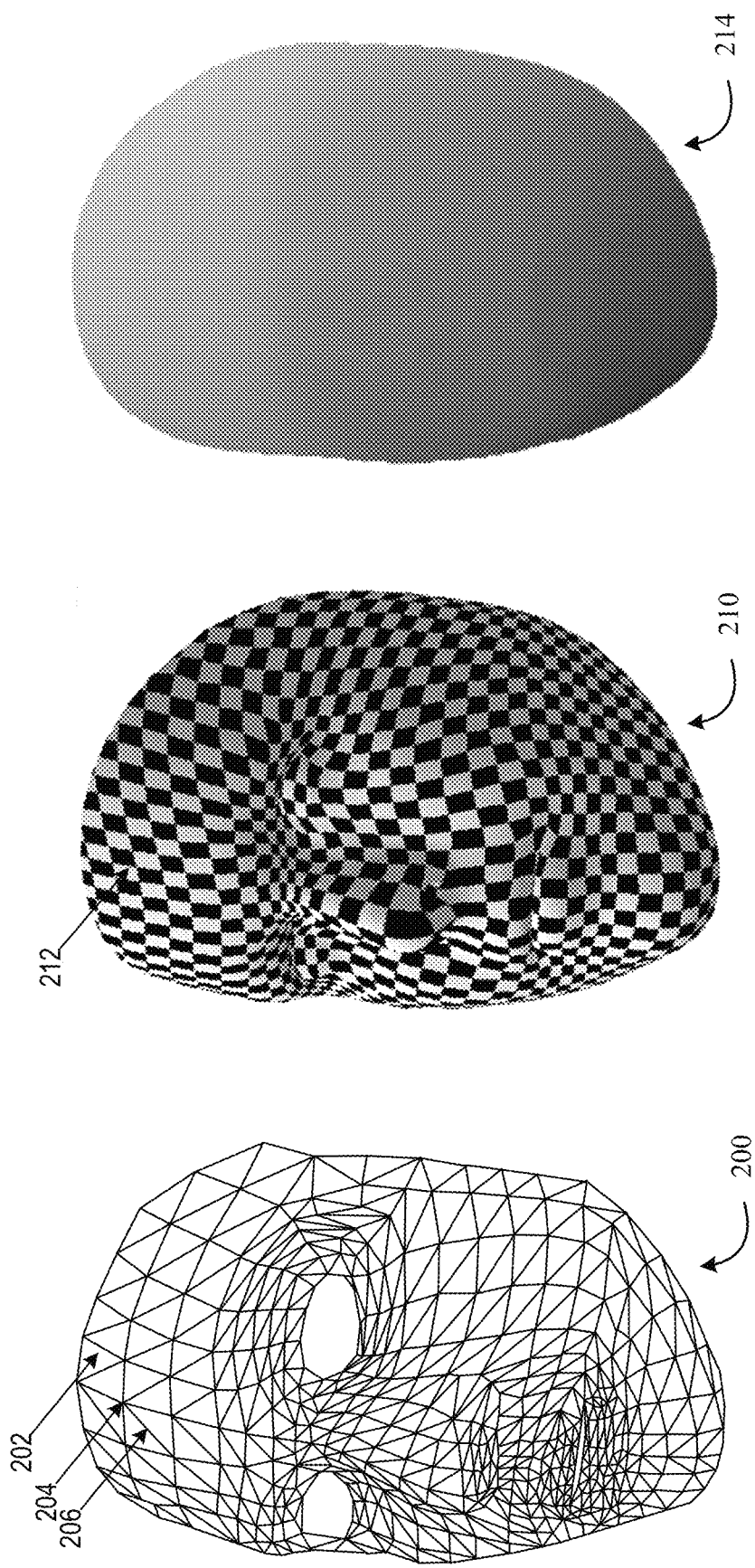
FIG. 2 is a simplified schematic diagram illustrating a 3-dimensional (3D) polygon mesh representing a geometrical surface corresponding to a facial area of a subject, a textured surface illustrated with the use of texture coordinates of the 3D polygon mesh, and a coordinates mapping texture, according to at least one embodiments.
Figure 3:
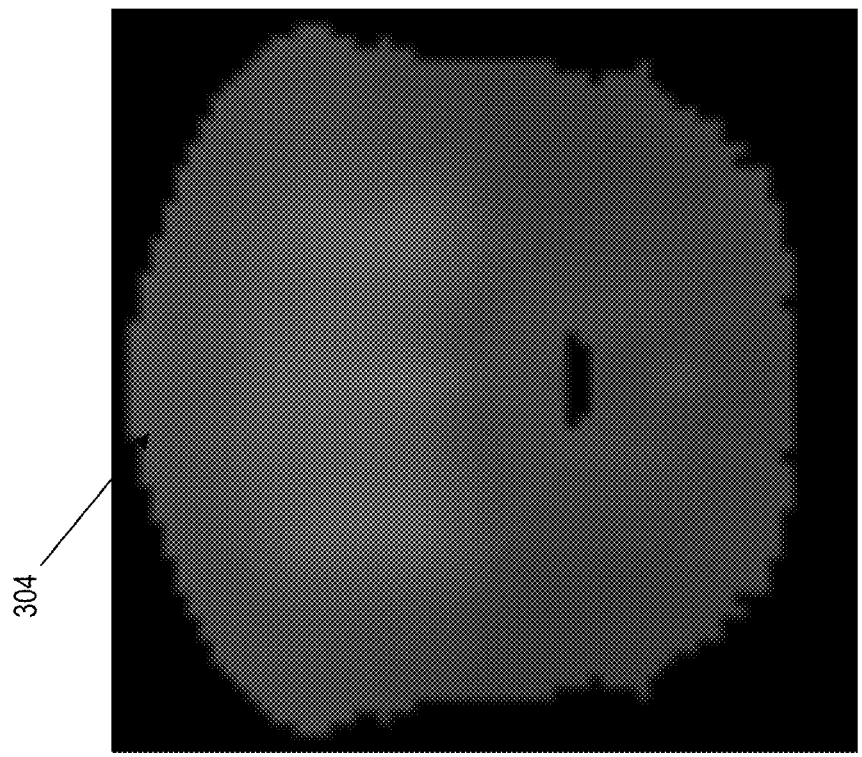
FIG. 3 is a simplified schematic diagram illustrating two example target images represented in 2-dimensional (2D) texture space, the target images being generated utilizing a source image and the 3D polygon mesh of FIG. 2, according to at least one embodiments.
Figure 3:
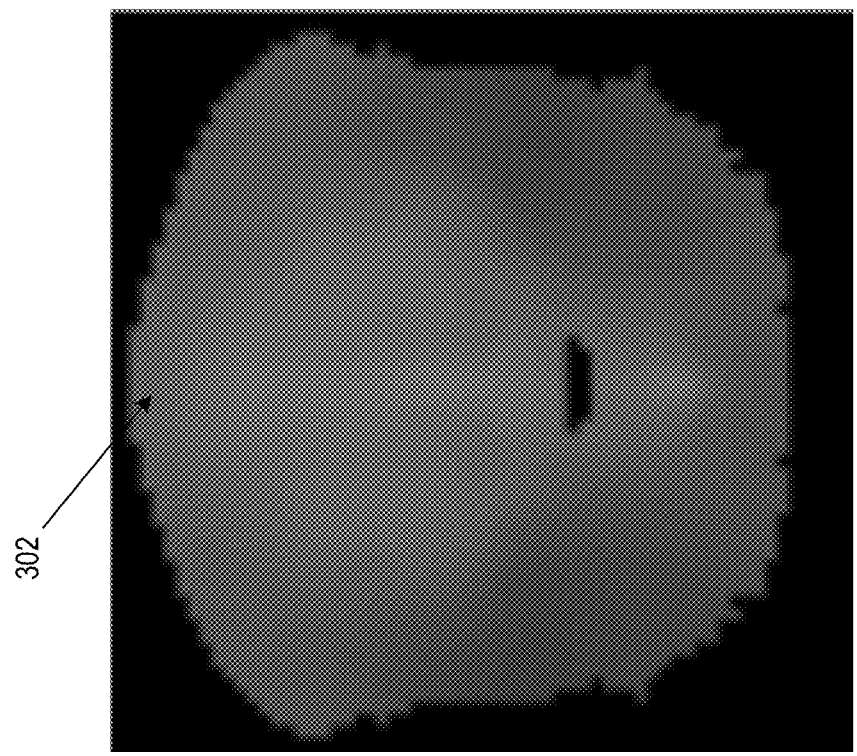
Figure 3:
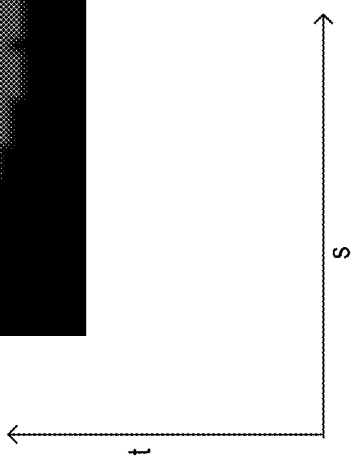

FIG. 2 is a simplified schematic diagram illustrating a 3-dimensional (3D) polygon mesh representing a geometrical surface corresponding to a facial area of a subject, a textured surface illustrated with the use of texture coordinates of the 3D polygon mesh, and a coordinates mapping texture, according to at least one embodiments. By way of example, the mesh 200 of FIG. 2 (e.g., a polygon mesh) may represent the facial area of a subject. As depicted, the mesh 200 may include a collection of vertices, edges, and faces that defines the shape of a polyhedral object in 3D (e.g., the subject's face). As shown in FIG. 2, the faces (e.g., the face 202) of the mesh 200 may be depicted as triangles. It should be appreciated that the mesh 200 may include faces including quadrilaterals, or other simple convex polygons, or concave polygons, and/or polygons with holes. The mesh 200 may include any suitable number of vertices (e.g., the vertex 204) and/or any suitable number of edges (e.g., the edge 206). A vertex may indicate a position (e.g., in 3D space) along with other information such as a RGB color, a normal vector, and/or texture coordinates. An edge may connect two vertices. It should be appreciated that the mesh 200 may be represented in a variety of ways for example utilizing face-vertex meshes, winged-edge meshes, half-edge meshes, quad-edge meshes, corner tables, vertex-vertex meshes, and the like.

Texture coordinates may be depicted at 210 (visualized in screen-space by applying checkerboard texture pattern to the mesh) and may be used to generate the coordinate mapping texture 214, in order to identify the mapping of screen space pixel coordinates of image data to 2D texture space coordinates (s, t). The generated coordinate mapping texture 214 may also be used to transform image data as a whole from screen-space to 2D texture space. It should be appreciated that the texture coordinates at 210 and coordinate mapping texture 214 may vary and that the texture coordinates illustrated at 210 are merely one example. Each square (e.g., a white or black square such as square 212) may be associated with an area of texture coordinates and rows or columns of checkers may represent a change (increase or decrease) in texture coordinates, as seen in screen-space. The texture coordinates depicted at 210 may be assigned to the 3D mesh's vertices (e.g, to vertex 204) and utilized with the 3D mesh 200 to map screen-space coordinates or image data (of the image to which the 3D mesh is fit) to 2D texture space. FIG. 3 further illustrates the resulting image data as presented in 2D texture space.

FIG. 3 is a simplified schematic diagram illustrating two example target images represented in 2D texture space, the target images being generated utilizing the coordinate mapping texture 214 of FIG. 2, according to at least one embodiments. In 2D texture space, the target image 302 and the target image 304 may be depicted in a graph, array, grid, or any suitable storage container of any suitable size (e.g., 64×64 indexed array). The target image 302 and the target image 304 (both depicted in 2D texture space) may each be generated from a target image discussed above in connection with FIG. 1. Each of the target images 302 and 304 may be plotted according to the s-axis and t-axis depicted. For example, a target image may be generated from a source image in screen space (e.g., by applying particular lighting techniques associated with a virtual lighting mode to the source image). A 3D mesh (e.g., the mesh 200) may be fit to the facial area of the subject of the first image in screen space. Texture coordinates may be identified via the 3D mesh and these texture coordinates may be utilized to map the target image data from screen space to 2D texture space. The target image 302 and the target image 304 each depicting a corresponding target image after this mapping has occurred.

Figure 4:
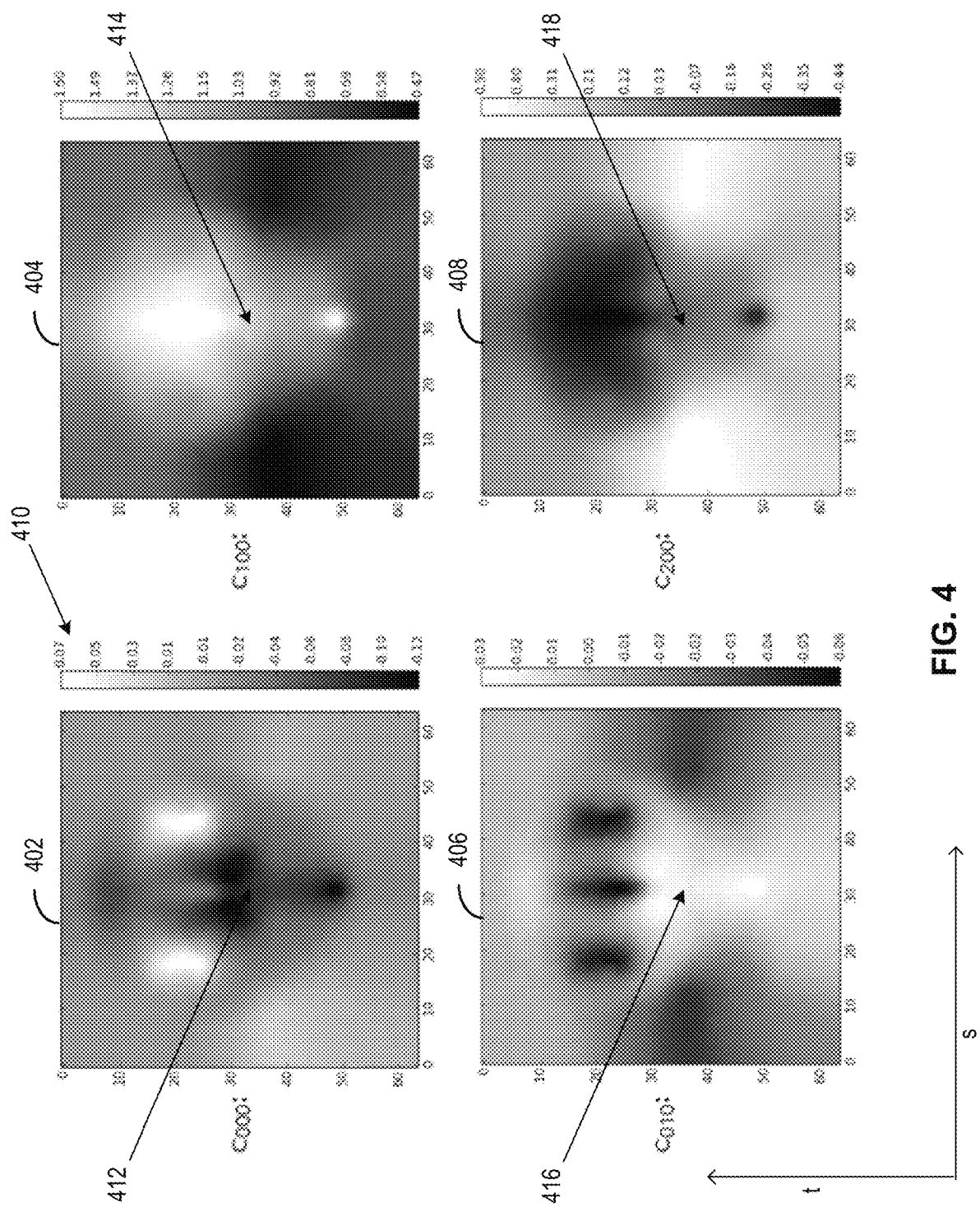
FIG. 4 is a simplified schematic diagram illustrating four example functional lightmaps corresponding to four coefficient indices of particular terms of the model, according to at least one embodiments.

FIG. 4 is a simplified schematic diagram illustrating four example functional lightmaps corresponding to four coefficient indices of particular terms of the model, according to at least one embodiments. A "polynomial lightmap," as used herein may be an example of a functional lightmap. The example of FIG. 4 includes polynomial lightmaps 402, 404, 406, and 408. Polynomial lightmap 402 represents the coefficient $C_{000}$ ($C_{m,n,p}$ described in FIG. 1 using values 0, 0, and 0 for m, n, and p respectively). Polynomial lightmap 404 represents the coefficient $C_{100}$ ($C_{m,n,p}$ described in FIG. 1 using values 1, 0, and 0 for m, n, and p respectively). Polynomial lightmap 406 represents the coefficient $C_{010}$ ($C_{m,n,p}$ described in FIG. 1 using values 0, 1, and 0 for m, n, and p respectively). Polynomial lightmap 408 represents the coefficient $C_{200}$ ($C_{m,n,p}$ described in FIG. 1 using values 2, 0, and 0 for m, n, and p respectively). In the examples Polynomial lightmaps depicted, each Polynomial lightmap is plotted according to the s-axis and t-axis depicted. Thus, each Polynomial lightmap, as depicted, includes 64×64 (4,096) texels.

Each functional lightmap may depict color values for each coordinate. The color values may be interpreted by the color range corresponding to the functional lightmap. For example, color range 410 may be utilized to interpret the color value at 412 provided within the polynomial lightmap 402. It should be appreciated that the color value provided at 412, 414, 416, and 418, each represent different color values of the same texel coordinate within each polynomial lightmap. In some embodiments, the target images transformed to the 2D texture space (depicted in FIG. 3) may have holes (i.e., missing color information due to occlusions). In some embodiments, any suitable hole-filling/extrapolation process may be applied to the lightmap output of the training as part of a process for generating the functional lightmaps of the model (e.g., the polynomial lightmaps 402-408). For example, any suitable inpainting algorithm can be used to fill holes and extrapolate the fitted parameters (coefficients $C_{m,n,p}$) in 2D texture space. By utilizing this hole-filling/extrapolation process, any holes or undefined texel data originally occurring in the polynomial lightmaps 402-408 may be filled.

Figure 5:
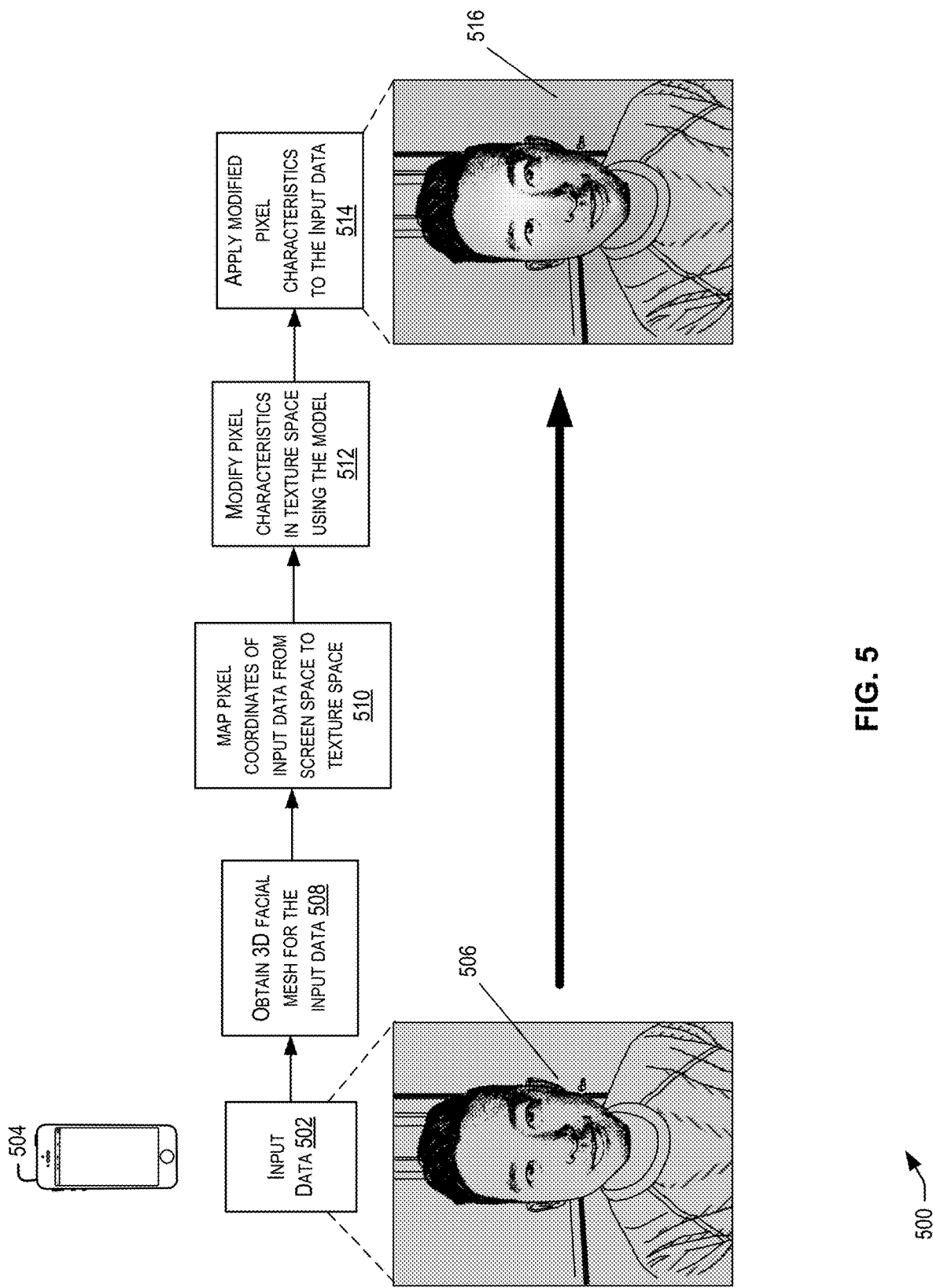
FIG. 5 is a simplified block diagram illustrating an example process for modifying image data in real time to provide virtual lighting adjustments, according to at least one embodiment.

FIG. 5 is a simplified block diagram illustrating an example process 500 for modifying image data in real time to provide virtual lighting adjustments, according to at least one embodiment. It should be appreciated that virtual lighting adjustments may be made at capture time, or at any suitable time subsequent to capturing or otherwise obtaining image data (e.g., an image or a frame of a video). For example, input data 502 may be an image or a frame of a video. Input data 502 may be collected at any suitable time. As a non-limiting example, input data 502 may correspond to a digital image captured using an image capture device (e.g., a camera of the user device 504). Input data 502 may depict one or more subjects (e.g., one or more people or portions of people). For example, subject 506 may be depicted in the input data 502. The input data 502 may be provided in screen space.

At 508, a facial mesh corresponding to subject 506 may be obtained for the input data 502. The facial mesh (e.g., the 3D mesh 200 of FIG. 2) may be obtained from any suitable source utilizing any suitable technique for fitting a 3D polygon mesh to a face of the subject 506. The facial mesh may define the shape and surface of the facial area of the subject 506.

At 510, the vertices of the facial mesh (e.g., the 3D mesh 200 of FIG. 2 as fit to the face of the subject 506) may have assigned texture coordinates. By way of example, the facial mesh (e.g., the 3D mesh 200) may have assigned texture coordinates illustrated at 210 of FIG. 2). Utilizing the texture coordinates, the facial mesh may be utilized to map the pixel coordinates of input data 502 (or a portion of the input data 502 corresponding to the subject's face) from screen space to 2D texture space by means of a coordinate mapping texture (e.g., the coordinate mapping texture 214 of FIG. 2).

At 512, pixel characteristics (e.g., RGB values, perceived brightness, hue, saturation, etc.) may be modified for each pixel using the model generated in FIG. 1. As discussed herein, each screen space coordinate (x, y) of input pixel from input data may be mapped to a particular coordinate in 2D texture space (s, t) and may be provided as coordinate input to the model. The parameters of the model may be queried at the coordinate input: from texels of functional lightmaps for a texture coordinates (s, t) of that texel in the discretized 2D texture space. An RGB color value of input data for a pixel (x, y) may be provided as a color input to the model. The output received from the model may be utilized to modify the RGB value.

At 514, once each RGB value has been provided to the model and output values obtained, the modified pixel characteristics may be applied to the input data 502 in screen space to produce image 516.

Figure 6:
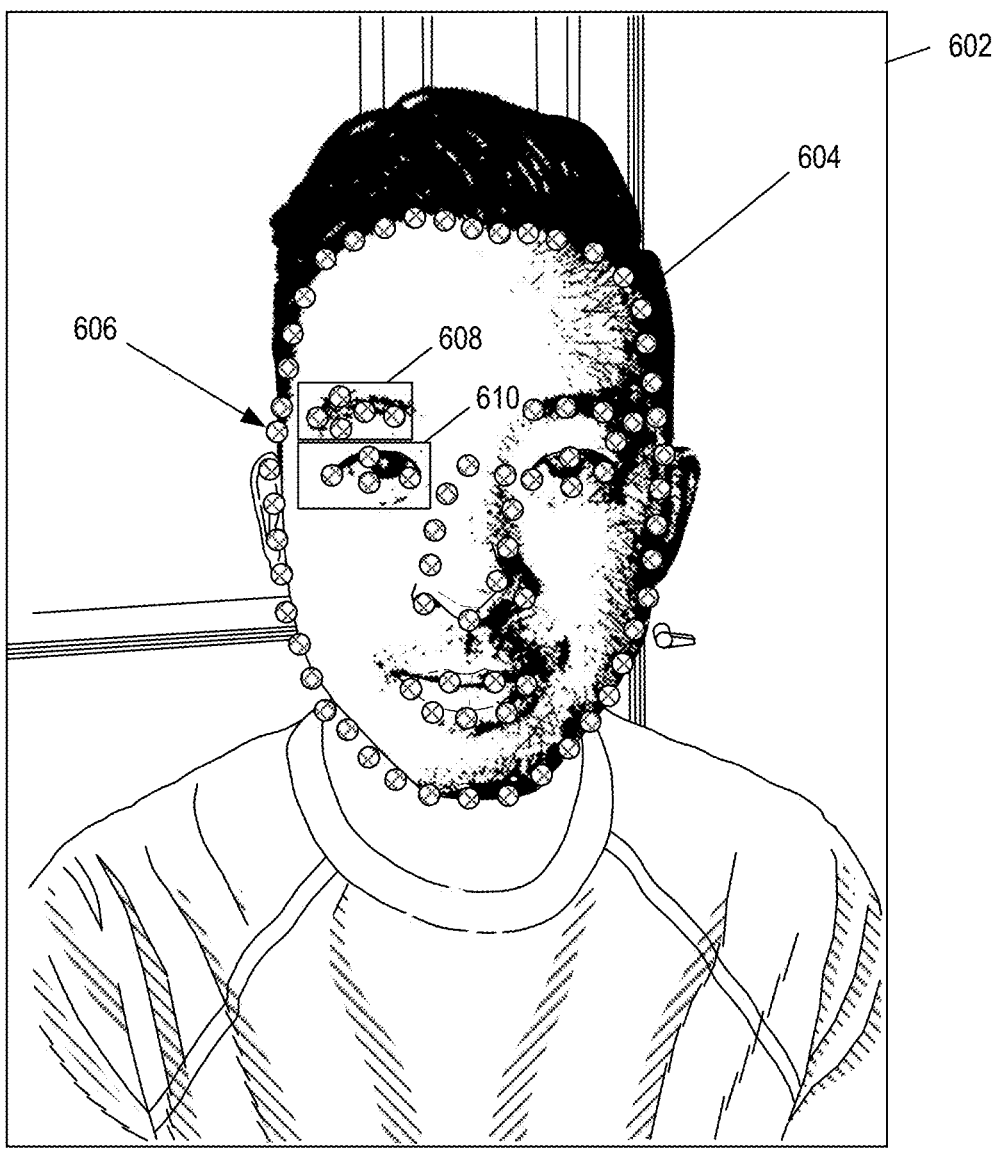
FIG. 6 is a simplified schematic diagram illustrating an example set of landmark points of an image, according to at least one embodiment.

FIG. 6 is a simplified schematic diagram 600 illustrating an example set of landmark points of an image (e.g., an image 602 of subject 604), according to at least one embodiment. The landmark point 606 is depicted as one of the set of landmark points of the image 602. Any description involving the landmark point 606 may similarly be applied to any of the landmark points depicted within FIG. 6. The landmark point 606 may be estimated based at least in part on one or more depth measurement values (and/or an RGB value) corresponding to one or more image pixels of the image 602. In some embodiments, any suitable number of depth measurement values may be utilized to determine the landmark point 606.

The number of landmark points depicted in FIG. 6 is intended to be illustrative in nature. Any suitable number of landmark points may correspond to the image 602. In some embodiments, the landmark point 606 may be associated with a label or identifier. The label/identifier may be unique to the landmark point 606 or the label/identifier may be shared between the landmark point 606 and one or more additional landmark points. By way of example, the landmark points 608 may be identified and individually associated label/identifier associated with a left eye area of the subject 604. Similarly, the landmark points 610 may be identified and individually associated with label/identifier associated with a left eyebrow area of the subject 604.

Figure 7:
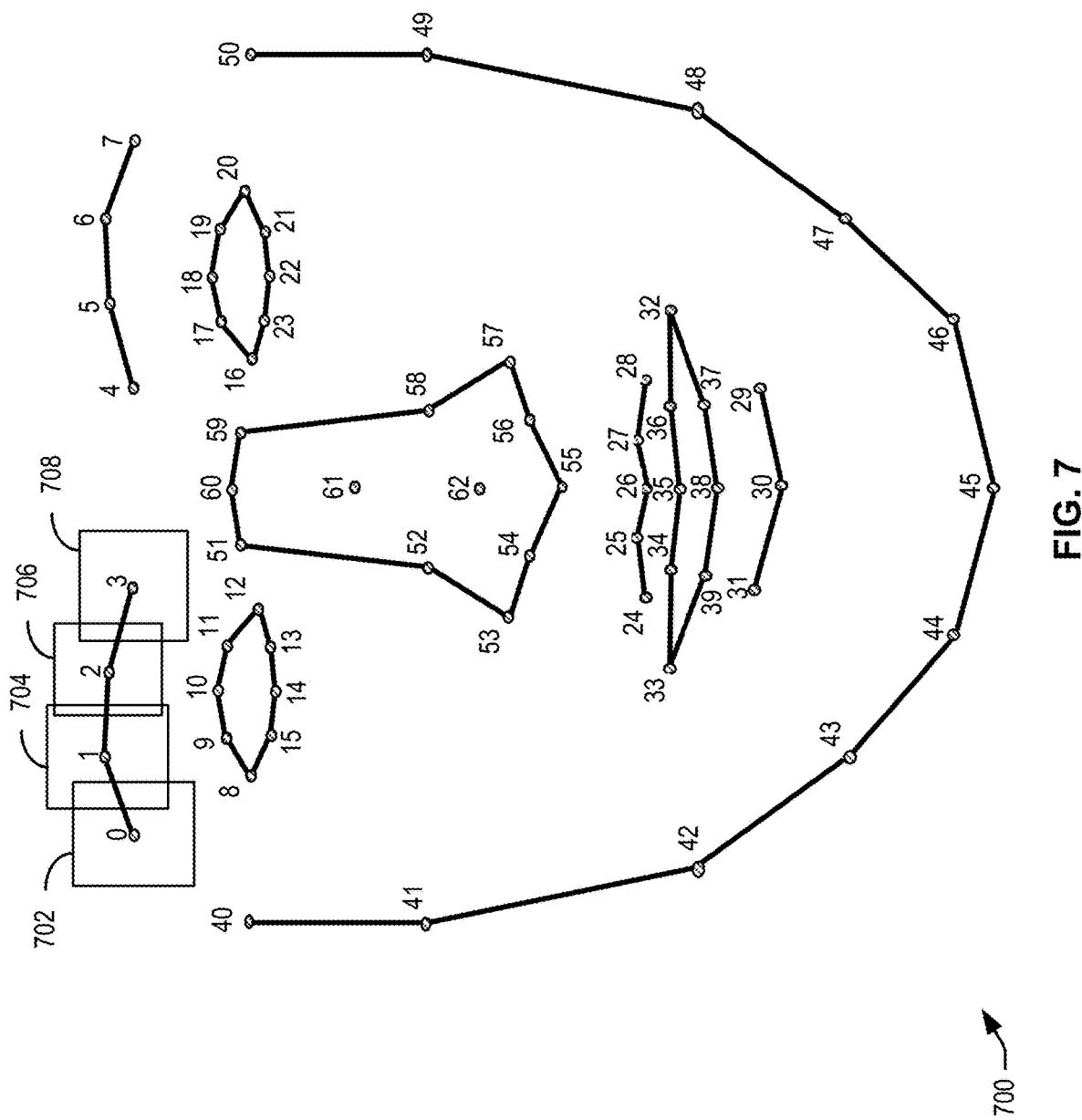
FIG. 7 is a simplified schematic diagram illustrating an example configuration of landmark points associated with an image, according to at least one embodiment.

FIG. 7 is a simplified schematic diagram illustrating an example configuration 700 of landmark points associated with an image, according to at least one embodiment. The configuration 700 includes 63 landmark points. However, any suitable number of landmark points may be utilized. Each landmark point (e.g., landmark points 0-62) may correspond to a pixel selected using image data (e.g., the subject image 102 of FIG. 1). Each landmark point may be selected from any suitable number of pixels within a given area based at least in part on depth measurement values and/or RGB values of the pixels in the given area. By way of example, landmark point 0 may be selected from pixels within area 702, landmark point 1 may be selected from pixels within area 704, landmark 2 may be selected from pixels within area 706, and landmark 3 may be selected from pixels within area 708. The area from which a landmark point is selected may vary in size and shape according to a predetermined scheme.

Each landmark point identified may be associated with a label or identifier corresponding to a particular landmark (e.g., a facial feature). As depicted in FIG. 4, landmark points 0-3 may be associated with a label/identifier indicating that landmark points 0-3 correspond to a left eyebrow. Similarly, landmark points 4-7 may be associated with a label/identifier indicating that the landmark points 4-7 correspond to a right eyebrow. Landmark points 8-15 may be associated label/identifier corresponding to a left eye, while landmark points 16-23 may be associated with a label/identifier corresponding to a right eye. Landmark points 24-31 may be associated or identified as corresponding to a mouth (or lips). Landmark points 32-39 may be labeled or identified as corresponding to teeth. Landmark points 40-50 may be labeled or identified as corresponding to an outline of the face. Landmark points 51-62 may be labeled or identified as corresponding to a nose.

Figure 8:
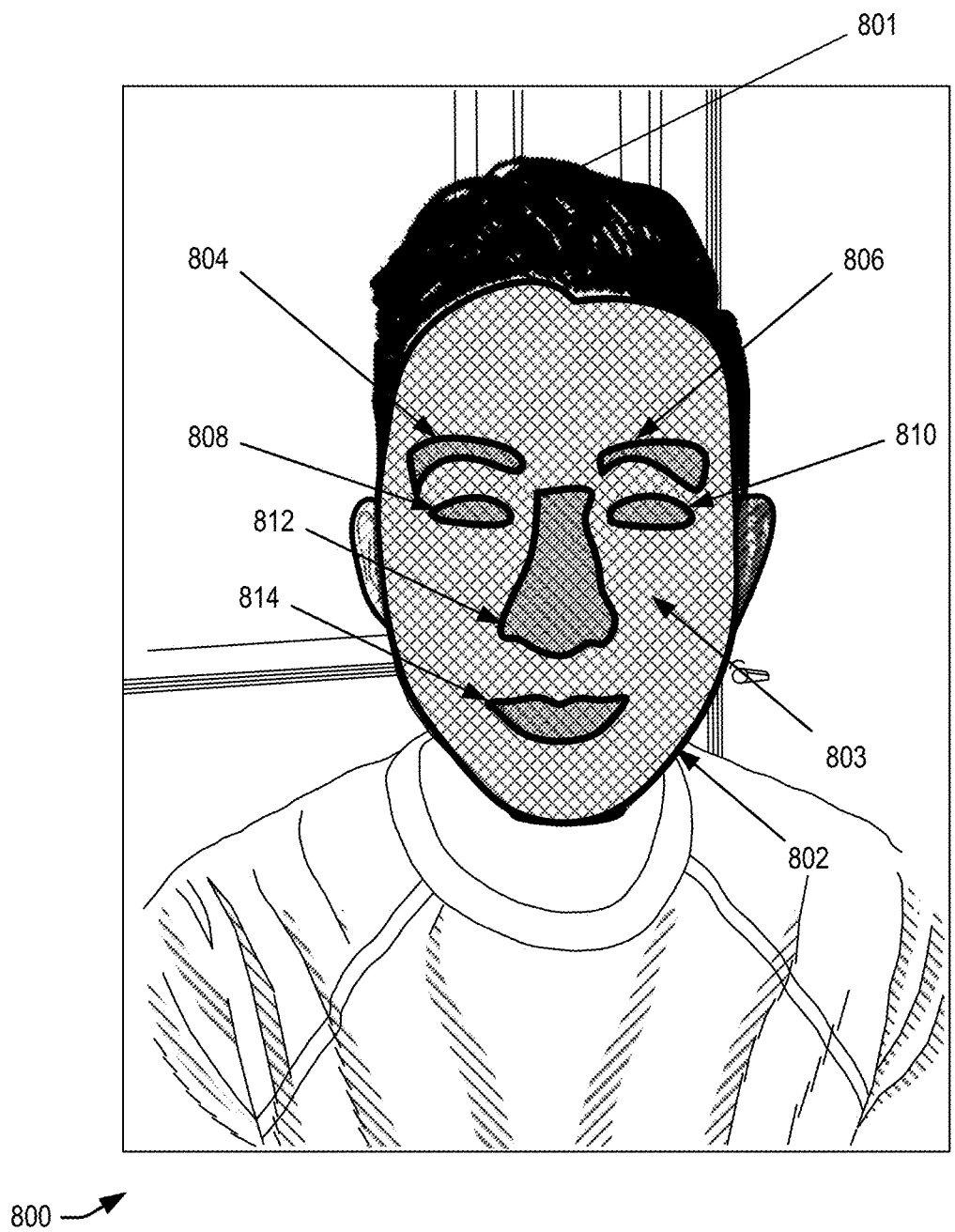
FIG. 8 is a simplified schematic diagram illustrating an example mask corresponding to an image, according to at least one embodiment.

FIG. 8 is a simplified schematic diagram illustrating an example mask 802 corresponding to an image 800, according to at least one embodiment. The mask 802 may be generated from the landmark points of FIG. 6 or FIG. 7 during a process for generating training data (e.g., the training data 112) as described above in connection with FIG. 1. For example, a facial area 803 (including the face and ears of the subject 801) may be determined from a subset of the landmark points of FIG. 7. A left eye-brow area 804, right eye-brow area 806, left eye area 808, right eye area 810, nose area 812, and mouth area 814 may be determined from respective subsets of the landmark points depicted in FIG. 7. In at least one embodiment, the mask 802 may be generated by removing or excluding the areas 804-814 from the facial area 803. In some examples, the mask 802 may define an area within which subsequent virtual lighting adjustments are to be applied. Areas outside the mask 802 may be excluded from the application of a virtual lighting adjustment. Accordingly, the area defined by the mask 802 may correspond to a subset of pixels of the image 800.

Figure 9:
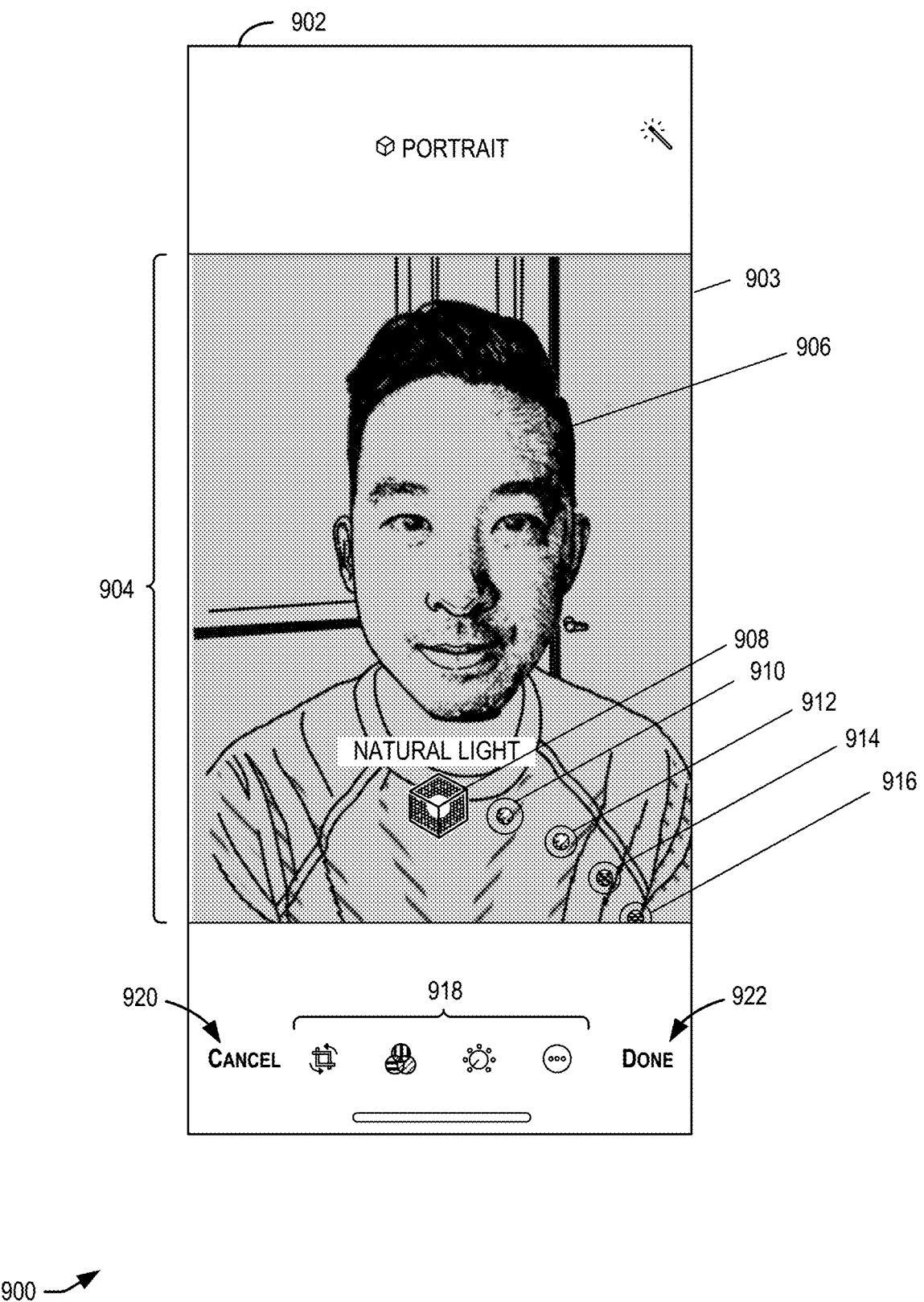
FIG. 9 is a simplified schematic diagram illustrating an example user interface for presenting and modifying image data, according to at least one embodiment.

FIG. 9 is a simplified schematic diagram illustrating an example user interface 900 for presenting and modifying image data, according to at least one embodiment. User interface 900 may be provided via a display 902. The display 902 may be a hardware component of a personal device (e.g., smartphone, mobile phone, wearable device, laptop, or the like). Within the user interface 900, a viewing area 904 is provided. The viewing area 904 may be configured to present an image 903 (e.g., an image including a subject 906, an example of the input data 502 of FIG. 5). It should be appreciated that the image 903 is intended to be illustrative in nature and that any suitable image may be presented within the viewing area 904.

In some embodiments, a number of user interface (UI) elements may be provided. For example, UI element 908 may be provided. The UI element 908 may correspond to a natural light mode that corresponds to a view of the image 903 as captured by a capture device (e.g., a camera) of the personal device. UI element 910 may be provided and may correspond to an option for selecting a contour lighting mode. UI element 912 may be provided and may correspond to an option for selecting a studio lighting mode. UI element 914 may be provided and may correspond to an option for selecting a stage lighting mode. UI element 916 may be provided and may correspond to an option for selecting a stage light mono lighting mode. The UI elements 908-916 may be presented within the user interface 900 as depicted or the UI elements 908-916 may be depicted in a different arrangement within the user interface 900. The UI elements 908-916 may be presented with icons as depicted in FIG. 9, and/or the UI elements 908-916 may be provided in a menu, via checkboxes, radio buttons, or any suitable interface element suitable for providing a user the means of selecting a lighting mode. It should be appreciated that more or fewer lighting mode options may be provided then those depicted in FIG. 9.

Selection of any one of the UI elements 908-916 (e.g., lighting modes) may cause the image data of image 903 to be modified according to the selection. That is to say, that upon selection of a UI element, the image 903 as a whole and/or a portion of the image 903 (e.g., subject 906) may be modified according to the lighting mode corresponding to the selected UI element. Modified image data (e.g., image 516) may replace the image 903 in the viewing area 904. If the user were to select another UI element corresponding to a different lighting mode, the viewing area 904 may present a modified image corresponding to the image 903 as modified according to the newly selected lighting mode.

In some embodiments, the user interface 900 may include additional editing options 918. The additional editing options 918 may correspond to a variety of conventional image editing techniques such as, but not limited to, cropping an image, adjusting the colors within an image, and adjusting a contrast and/or brightness of an image. The additional editing options 918 may be arranged as depicted in FIG. 9 although other arrangements are contemplated.

The user interface 900 may include a cancel option 920 and a done option 922. In some embodiments, selection of the cancel option 920 may cause a currently displayed image within the viewing area 904 to revert to an original state (e.g., the image 903 prior to the application of any editing and/or adjustments). Selection of the done option 922 may indicate that the user has completed his editing and/or adjustments. Upon selecting the done option 922 the image currently being presented within the viewing area 904 may be automatically saved or the user may be presented with an option to save the image.

Although not depicted, the user interface 900 may include more or fewer elements than those described above. For example, the user interface 900 may include options to apply any suitable filtering and/or a capture option (e.g., a capture button) that when selected, captures an image or video. In some embodiments, the user interface 900 may further include options to retrieve a previously stored image or video.

Figure 10:
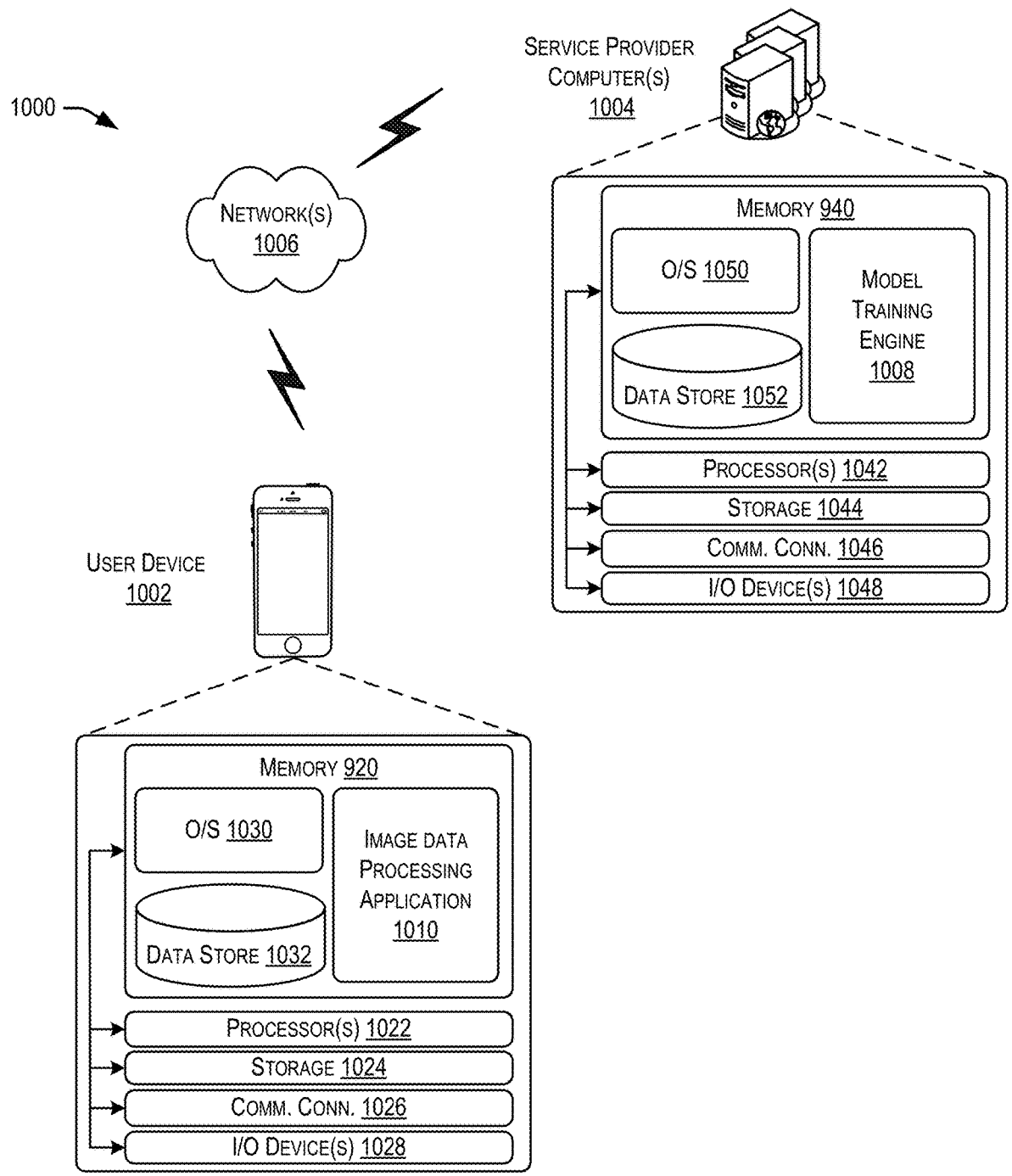
FIG. 10 illustrates components of an image processing system according to at least one embodiments.

FIG. 10 illustrates components of an image processing system 1000 according to at least one embodiments. System 1000 may include user device 1002 and/or service provider computer(s) 1004 that may communicate with one another via network(s) 1006 utilizing any suitable communications protocol.

In some examples, the network(s) 1006 may include any one or a combination of many different types of networks, such as cable networks, the Internet, wireless networks, cellular networks, and other private and/or public networks. While the illustrated example represents the user device 1002 communicating with the service provider computer(s) 1004 over the network(s) 1006, the described techniques may equally apply in instances where the user device 1002 interacts with the service provider computer(s) 1004 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the model training engine 1008, discussed further below in more detail, may operate in whole or in part on the user device 1002. In some embodiments, the model training engine 1008 may operate in whole or in part as part of the image data processing application 1010. Thus, in some embodiments, the user device 1002 and/or may access the functionality of the model training engine 1008 through components of the user device 1002 (and/or the image data processing application 1010) and/or the service provider computer(s) 1004 via user interfaces and/or APIs provided by the model training engine 1008.

As noted above, the user device 1002 may be configured to execute or otherwise manage applications or instructions for presenting a user interface (e.g., the user interface 900 of FIG. 9) and providing lighting mode adjustments to image data. The user device 1002 may be any type of computing device such as, but not limited to, a mobile phone (e.g., a smartphone), a tablet computer, a personal digital assistant (PDA), a laptop computer, a desktop computer, a thin-client device, a smart watch, a wireless headset, or the like.

In one illustrative configuration, the user device 1002 may include at least one memory 1020 and one or more processing units (or processor(s)) 1022. The processor(s) 1022 may be implemented as appropriate in hardware, computer-executable instructions, or combinations thereof. Computer-executable instruction or firmware implementations of the processor(s) 1022 may include computer-executable or machine-executable instructions written in any suitable programming language to perform the various functions described.

The memory 1020 may store program instructions that are loadable and executable on the processor(s) 1022, as well as data generated during the execution of these programs. Depending on the configuration and type of the user device 1002, the memory 1020 may be volatile (such as random access memory (RAM)) and/or non-volatile (such as read-only memory (ROM), flash memory, etc.). The user device 1002 may also include additional removable storage and/or non-removable storage 1024 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 1020 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 1020 and the additional storage 1024, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 1020 and the additional storage 1024 are both examples of non-transitory computer storage media. Additional types of computer storage media that may be present in the user device 1002 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 1002. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The user device 1002 may also contain communications connection(s) 1026 that allow the user device 1002 to communicate with a data store, another computing device or server, user terminals and/or other devices via one or more networks. Such networks may include any one or a combination of many different types of networks, such as cable networks, the Internet, wireless networks, cellular networks, satellite networks, other private and/or public networks, or any combination thereof. The user device 1002 may also include I/O Device(s) 1028, such as a touch input device, an image capture device, a video capture device, a keyboard, a mouse, a pen, a voice input device, a display, a speaker, a printer, etc.

Turning to the contents of the memory 1020 in more detail, the memory 1020 may include an operating system 1030 and/or one or more application programs or services for implementing the features disclosed herein. The memory 1020 may include data store 1032 which may be configured to store image data and/or one or more models corresponding to one or more virtual lighting modes. The memory 1020 may include the image data processing application 1010.

In some examples, the image data processing application 1010 may be configured to provide the user interface 900 at the user device 1002 (e.g., at a display of the I/O Device(s) 1028). As part of providing the user interface 900, the image data processing application 1010 may be configured to retrieve image data (e.g., from data store 1032) for presenting a digital image or video at the user interface 900. The image data may be an example of the input data 502 of FIG. 5. In some examples, the image data may include headshot image data corresponding to a headshot of a subject of the digital image. In some examples, the image data processing application 1010 may present the user interface 900, or any suitable user interface for presenting and/or modifying image data. Additionally, in some examples, the image data processing application 1010 may be configured to receive and/or interpret user input, user interface element selections, and/or gesture information (e.g., via touch screen) for interacting with the user interface 900. In some embodiments, the image data processing application 1010 may be configured to provide modified image data (e.g., modified according to a particular virtual lighting mode) at the user interface 900.

In some aspects, the service provider computer(s) 1004 may be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 1004 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 1004 may be in communication with the user device 1002 via the network(s) 1006. The service provider computer(s) 1004 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 1004 may include at least one memory 1040 and one or more processing units (or processor(s)) 1042. The processor(s) 1042 may be implemented as appropriate in hardware, computer-executable instructions, firmware, or combinations thereof. Computer-executable instruction or firmware implementations of the processor(s) 1042 may include computer-executable or machine-executable instructions written in any suitable programming language to perform the various functions described.

The memory 1040 may store program instructions that are loadable and executable on the processor(s) 1042, as well as data generated during the execution of these programs. Depending on the configuration and type of service provider computer(s) 1004, the memory 1040 may be volatile (such as RAM) and/or non-volatile (such as ROM, flash memory, etc.). The service provider computer(s) 1004 or servers may also include additional storage 1044, which may include removable storage and/or non-removable storage. The additional storage 1044 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1040 may include multiple different types of memory, such as SRAM, DRAM, or ROM.

The memory 1040, the additional storage 1044, both removable and non-removable, are all examples of computer-readable and non-removable storage media. For example, computer-readable storage media may include volatile or non-volatile, removable or non-removable media implemented in any method or technology for storage of information such as computer-readable instructions, data structures, program modules, or other data. The memory 1040 and the additional storage 1044 are all examples of computer storage media. Additional types of computer storage media that may be present in the service provider computer(s) 1004 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 1004. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 1004 may also contain communications connection(s) 1046 that allow the service provider computer(s) 1004 to communicate with a stored database, another computing device (e.g., the user device 1002) or server, user terminals and/or other devices on the network(s) 1006. The service provider computer(s) 1004 may also include I/O device(s) 1048, such as a keyboard, a mouse, a pen, a voice input device, a touch input device, a display, speakers, a printer, etc.

Turning to the contents of the memory 1040 in more detail, the memory 1040 may include an operating system 1050, one or more data stores 1052, and/or one or more application programs, modules, or services for implementing the features disclosed herein, such as the features provided by the model training engine 1008. In at least one embodiment, the model training engine 1008 may be configured to perform any operation described in connection with FIG. 1 to train one or more models. Each model may correspond to a particular virtual lighting mode.

The user device 1002 may be configured with an image data processing application 1010 that enables the user to capture and/or retrieve (from storage) an image and/or video (e.g., image data. Once image data is obtained (captured/retrieved), the user may preview the image and select from a variety of lighting modes. In some embodiments, the user may select a lighting mode prior to capture/retrieval time, such that an image data captured may be modified in accordance with lighting mode previously selected. By way of example, a user may use a personal computing device with image capture functionality/hardware (e.g., a smartphone, wearable device, laptop, etc.) to capture an image. The captured image can include headshot image data corresponding to any suitable number of subjects within the image. A preview of the captured image can be displayed by the image data processing application 1010 (e.g., via a display of the user device 1002). In some examples, the image data processing application 1010 may apply a smoothing technique (e.g., a noise reduction algorithm) to the previewed image to reduce image noise produced during capture. In some embodiments, a "fill" light may be applied by the image processing application 1010 to the subject(s) in the image (e.g., the face(s) of the subject(s)) to smooth out shadows and uneven illumination. The skin-tone of the subject(s) may be maintained to provide lighting adjustments without washing out the image. This may have the effect of providing a more realistic modification that closely resembles lighting adjustments physically performed by a professional photographer. A user interface may be provided that allows the user to select one of the various lighting modes (e.g., contour, studio, stage, etc.) with which to modify the previewed image.

The image data processing application 1010 of user device 1002 may be configured to receive/obtain a lighting adjustment mode selection (e.g., as selected by the user). Depending on the lighting adjustment mode selected, the image data processing application 1010 may obtain a model (e.g., stored at data store 0132) that corresponds to the lighting adjustment mode selected. The image data processing application 1010 may be configured to perform any operations discussed in connection with FIG. 5 to apply virtual lighting adjustments associated with the selected virtual lighting mode to various pixels of the image data according to the process described in FIG. 5.

Figure 11:
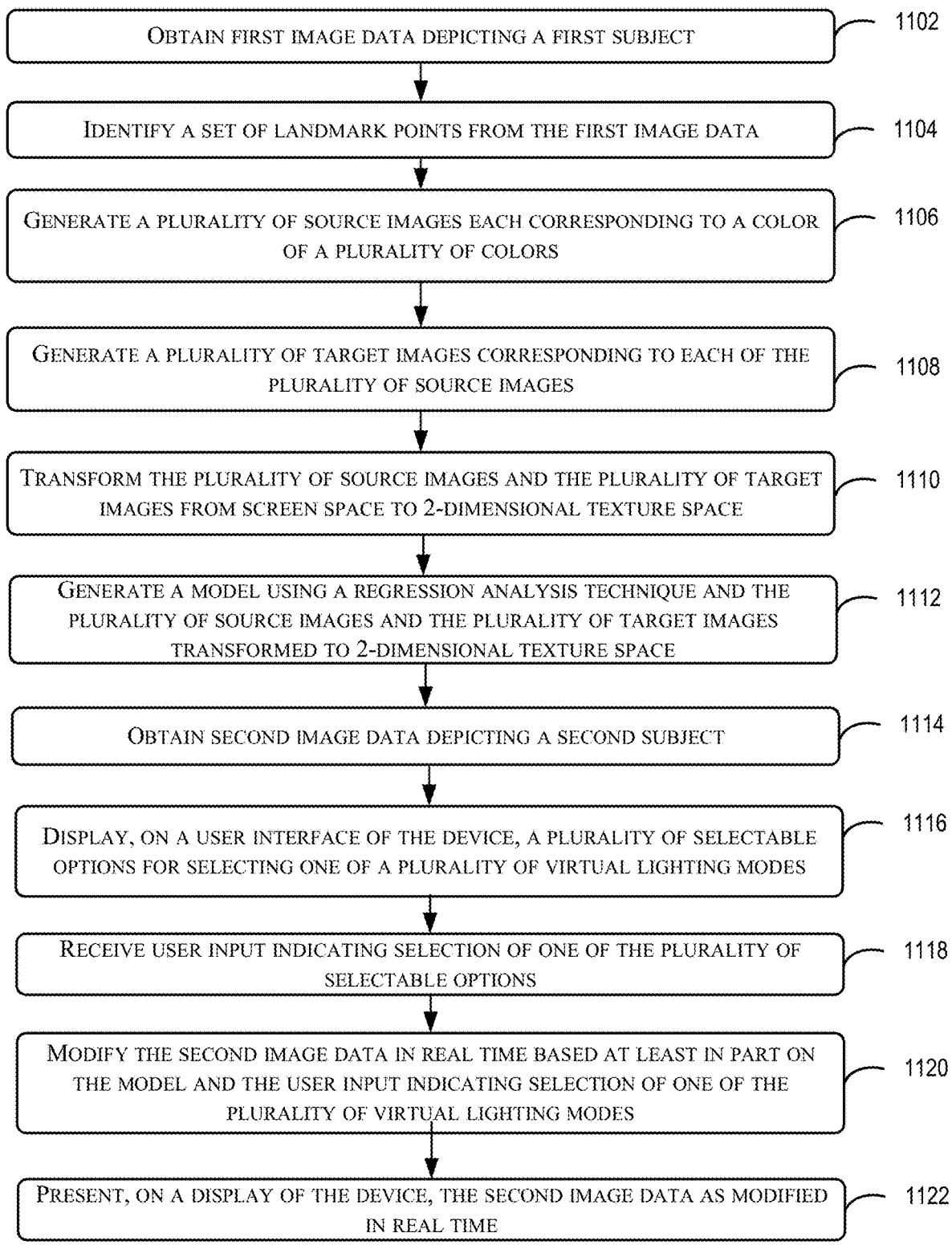
FIG. 11 is a simplified flow diagram illustrating an example process for modifying image data as described herein, according to at least one embodiment.
Figure 12:
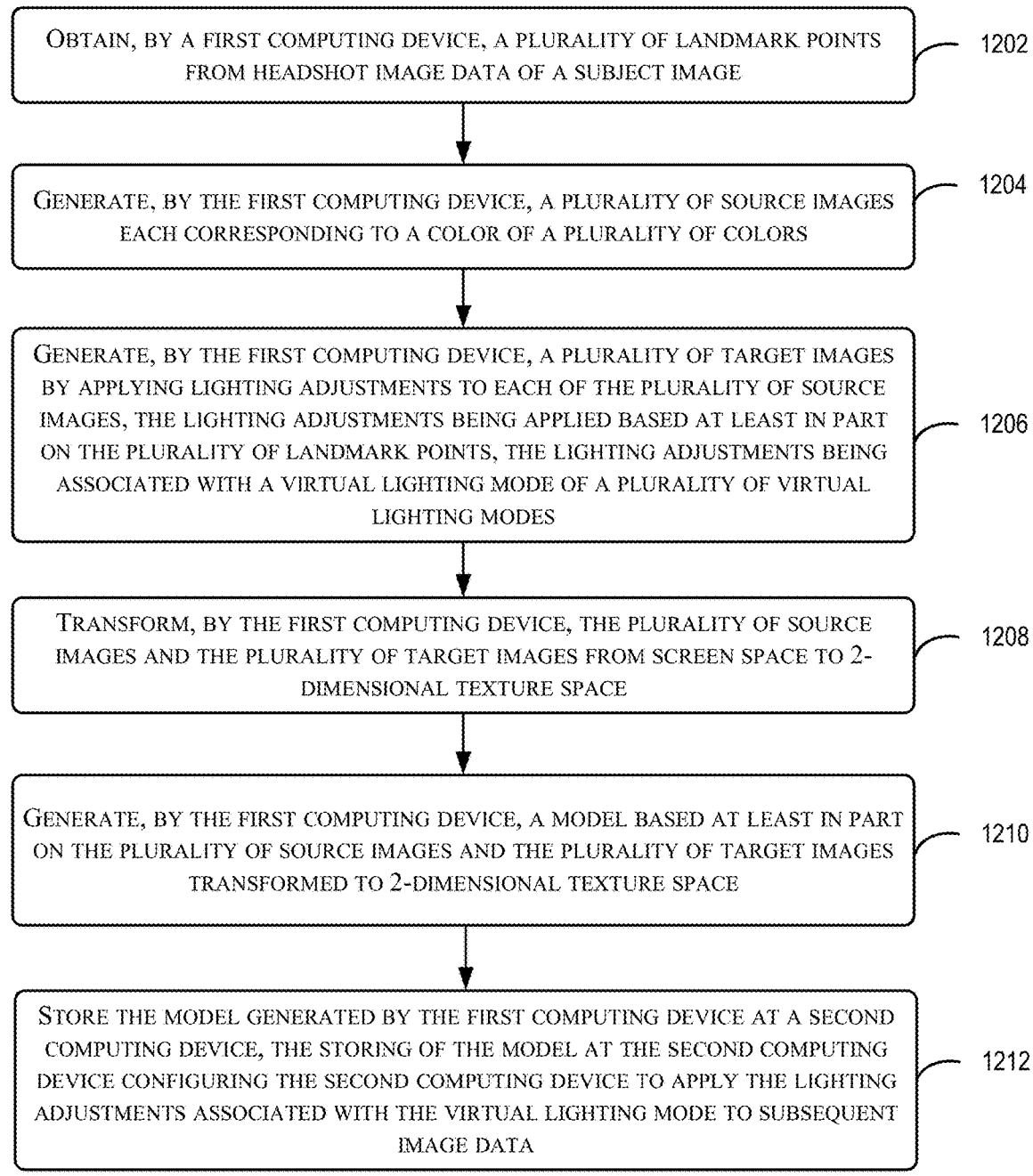
FIG. 12 is a simplified flow diagram illustrating another example process for modifying image data, according to at least one embodiment.
Figure 13:
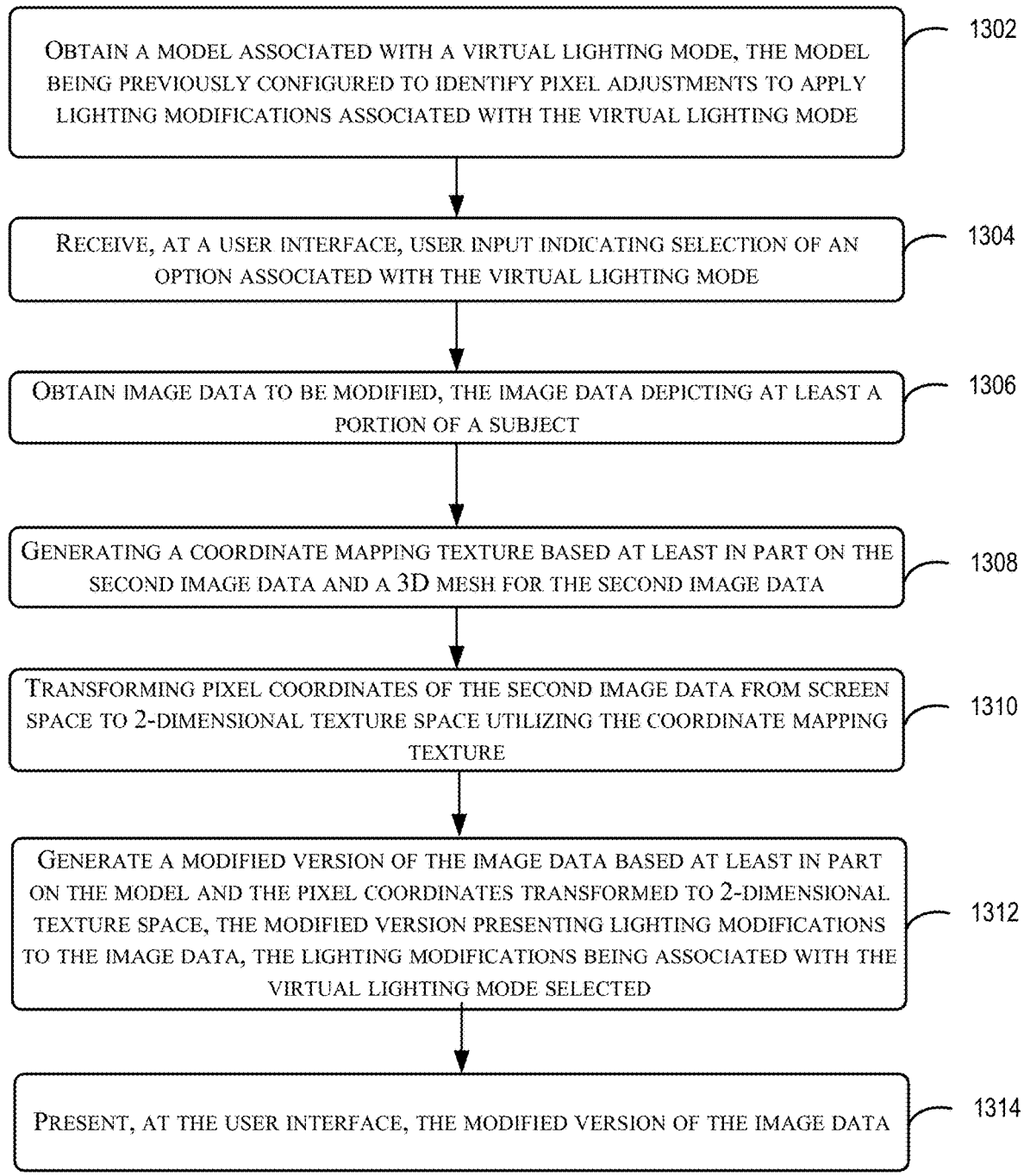
FIG. 13 is a simplified flow diagram illustrating an example process for utilizing a model to apply lighting adjustments to image data in accordance with the virtual lighting techniques as described herein, according to at least one embodiment.

FIGS. 11-13 illustrate simplified flow diagrams showing respective methods 1100, 1200, and 1300 for providing virtual lighting adjustments to image data and/or training a model to identify virtual lighting adjustments as described herein. These methods 1100, 1200, and 1300 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 11 is a simplified flow diagram illustrating an example method 1100 for modifying image data according to a virtual lighting mode, according to at least one embodiment. In some examples, the method 1100 may be performed by the user device 1002 of FIG. 10, the service provider computer(s) 1004 of FIG. 10, or any suitable combination thereof.

The method 1100 may begin at 1102 where first image data (e.g., the subject image 102 of FIG. 1) depicting a first subject (e.g., a portion of a person) may be obtained. The first image may be captured via a capture device (e.g., of the service provider computer(s)) or obtained from a suitable storage location including first headshot image data may be obtained (e.g., by the model training engine 1008 of FIG. 10). The first image data may include any suitable number of subjects. Accordingly, at least a portion of the first image data (e.g., headshot image data of the first image data) may correspond to a facial area (and/or an area within a threshold distance from the facial area and including the facial area) of the subject(s).

At 1104, a set of landmark points may be identified from the first image data. The set of landmark points may correspond to various locations with the facial area (e.g., the chin, the nose, the left eye-brow, etc. The set of landmark points may be identified based at least in part on the depth measurements and/or RGB values of the first image data. Further details regarding identifying the set of landmark points may be described further in U.S. patent application Ser. No. 16/032,418 filed Jul. 11, 2018, entitled "Techniques for Providing Virtual Light Adjustments to Image Data," the disclosure of which is incorporated by reference herein in its entirety for all purposes.

At 1106, a plurality of source images may be generated (e.g., by the model training engine 1008). In some embodiments, the plurality of source images may each correspond to a color of a plurality of colors. By way of example, one source image may correspond to a particular yellow while another source image may correspond to a particular blue. The plurality of source images may be generated in any suitable color space (e.g., RGB color space).

At 1108, a plurality of target images may be generated (e.g., by the model training engine 1008). Each of the plurality of target images may correspond to one of the plurality of source images. In some embodiments, the plurality of target images may be generated by performing lighting adjustments associated with a virtual lighting mode of a plurality of virtual lighting modes to each of the plurality of source images. Further details for performing these lighting adjustments to source images are provided above in connection with FIG. 1.

At 1110, the plurality of source/target images may be transformed (e.g., by the model training engine 1008) from screen space to 2D texture space. As discussed above in connection with FIG. 1, a 3D mesh may be fit to the facial area of the first image. Texture coordinates may be assigned to the 3D mesh and utilized to map the image data of each source/target image from screen space to 2D texture space.

At 1112, a model may be generated using a regression analysis technique and the plurality of source/target images in 2D texture space. The model may be generating according to the description described above in connection with FIG. 1.

At 1114, second image data may be obtained. In some embodiments, the second image data may be captured with a camera of a device (e.g., the user device 1002 of FIG. 10) or the second image data may be retrieved from storage (e.g., memory of the user device 1002 of FIG. 10). In some embodiments, the second image data may be captured or obtained utilizing the image data processing application 1010 of FIG. 10. In some embodiments, the second image data may include headshot image data. The headshot image data may correspond to one or more subjects depicted by the second image data.

At 1116, a plurality of selectable options for selecting one of the plurality of virtual lighting modes may be displayed (e.g., by the image data processing application 1010) on a user interface of the device. By way of example, the user interface 900 of FIG. 9 may be provided which provides UI elements 910-916 which individually may correspond to an option for selecting a virtual lighting mode.

At 1118, user input selecting one of the plurality of selectable options may be received (e.g., by the image data processing application 1010). In some embodiments, the user input may indicate a selection of one of the plurality of virtual lighting modes.

At 1120, the second image data may be modified in real time based at least in part on the model and the user input indicating selection of one of the plurality of virtual lighting modes. By way of examples, the model corresponding to the selected virtual lighting mode may be obtained. Utilizing the process described above in connection with FIG. 5, the model may be utilized to identify adjustments to be made to the second image data. The second image data may be modified according to these adjustments in order to apply the lighting adjustments associated with the selected virtual lighting mode.

At 1122, the second image data as modified may be presented on a display of the devices.

FIG. 12 is a simplified flow diagram illustrating another example process 1200 for modifying image data, according to at least one embodiment. The method 1200 may be performed by the system 1000. The system 1000, as depicted in FIG. 10, may include a first computing device (e.g., the service provider computer(s) 1004) and a second computing device (e.g., the user device 1002). In some embodiments, the first computing device and the second computing device individually comprising one or more memories configured to store computer-executable instructions and one or more processors configured to execute the computer-executable instructions to perform the operations of method 1200.

The method 1200 may begin at 1202, where a plurality of landmark points may be obtained (e.g., by the model training engine 1008 of the first computing device). In some embodiments, the plurality of landmark points may be obtained from headshot image data of a subject image. The headshot image data may correspond to a subject(s) depicted in the subject image. In some embodiments, multiple subject images may be utilized. The landmark points may correspond to particular locations/portions of the headshot image data. Any suitable number of landmark points may be obtained using the subject image (and/or the headshot image data of the subject image) based at least in part on analyzing depth measurement values and/or RGB values of the subject image. A set of landmark points may define a particular area of the headshot. By way of example, one set of landmark points may define an outline of the subject's head, while another set of landmark points may define an area corresponding to the subject's eyebrow(s), mouth, eye(s), nose, teeth, or the like.

At 1204, a plurality of source images may be generated (e.g., by the model training engine 1008 of the first computing device). The plurality of source images may be generated in the manner discussed above in connection with FIG. 1. As described above, the plurality of source images may each correspond to a color of a color space (e.g., the RGB color space).

At 1206, a plurality of target images may be generated (e.g., by the model training engine 1008 of the first computing device) by applying lighting adjustments to each of the plurality of source images. In some embodiments, the lighting adjustments may be applied based at least in part on the plurality of landmark points. In some examples, the lighting adjustments may be associated with a virtual lighting mode of a plurality of virtual lighting modes.

At 1208, the plurality of source/target images may be transformed (e.g., by the model training engine 1008 of the first computing device) from screen space to 2D texture space in the manner discussed above in connection with FIG. 1.

At 1210, a model may be generated based at least in part on the plurality of source images (or at least the RGB color combination corresponding to each of source images) and the plurality of target images as transformed to 2D texture space. Additional details as to model generation is discussed above in connection with FIG. 1.

At 1220, the model generated by the first computing device may be stored at a second computing device (e.g., via the image data processing application 1010). In some embodiments, the model is stored as a number of functional lightmaps (e.g., functional lightmaps similar to those discussed above in FIG. 4). In some embodiments, the model generated by the model training engine 1008 of the first computing device may be provided to, or obtained by, the second computing device at any suitable time. The storing of the model at the second computing device may configure the second computing device to apply the lighting adjustments associated with the virtual lighting mode to any subsequently captured, obtained, and/or retrieved image data (e.g., an image and/or one or more video frames). For example, the second computing device may retrieve image data from local memory and apply the lighting adjustments associated with the virtual lighting mode utilizing the model. Similarly, the second computing device may utilize the model to apply the lighting techniques associated with the virtual lighting mode to a newly captured image.

FIG. 13 is a simplified flow diagram illustrating an example process for utilizing a model to apply lighting adjustments to image data in accordance with the virtual lighting techniques as described herein, according to at least one embodiment. In some embodiments, the operations of method 1300 may be performed by a user device (e.g., the user device 1002).

Method 1300 may begin at 1302, where a model associated with a virtual lighting mode may be obtained (e.g., by the image data processing application 1010 of FIG. 10). In some embodiments, the model may be trained using a regression technique and a plurality of source/target images as discussed in connection with FIG. 1. The model may be configured to identify pixel adjustments for applying lighting modifications associated with the virtual lighting mode to an input image.

At 1304, user input may be received at a user interface (e.g., the user interface 900 of FIG. 9). In some embodiments, the user interface (e.g., interface 800) may be provided by the image data processing application 1010 of FIG. 10.

At 1306, image data may be obtained. For example, an image capture device (e.g., one of the I/O device(s) 1028 of FIG. 10) may be utilized (e.g., by the image data processing application 1010) to capture an image. In some embodiments, the image data may be obtained from memory (e.g., data store 1032 of the user device 1002 of FIG. 10).

At 1308, the image data and a 3D mesh (its texture coordinates) may be used to generate a coordinates mapping texture in the manner discussed above in connection with FIG. 5.

At 1310, the pixel coordinates of the second image data may be transformed from screen space to 2-dimensional texture space utilizing the coordinate mapping texture (e.g., the coordinate mapping texture 214 of FIG. 2).

At 1312, a modified version of the image data may be generated (e.g., by the image data processing application 1010) based at least in part on the model and the pixel coordinates transformed to 2D texture space, in the manner discussed above in connection with FIG. 5. In some embodiments, the modified version presents lighting modifications to the image data, the lighting modification may be associated with the virtual lighting mode selected.

At 1314, the modified version of the image data may be presented (e.g., by the image data processing application 1010) at the user interface (e.g., the user interface 900). By utilizing the model to generate the modified version of the image data, the method 1300 reduces the time for applying the virtual lighting techniques associated with the virtual lighting mode. For example, the time utilized to generate the modified version of the image data utilizing the model may be less than a time for performing operations such as identifying landmark points of the captured image, identifying areas associated with the landmark points, and modifying one or more characteristics (e.g., perceived brightness, hue, saturation, etc.) of pixels with the identified areas according to a predetermined scheme. Thus, substantially the same virtual lighting techniques may be applied to an image in a more efficient and less computationally extensive manner.

The specification and drawings are to be regarded in an illustrative rather than a restrictive sense. It will, however, be evident that various modifications and changes may be made thereunto without departing from the broader spirit and scope of the disclosure as set forth in the claims.

Illustrative methods, computer-readable medium, and systems for providing various techniques for communicating credential information are described above. Some or all of these systems, media, and methods may, but need not, be implemented at least partially by architectures and flows such as those shown at least in FIGS. 1-13 above. It should be understood that any of the above techniques can be used within any type of service provider computer and/or user device. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user devices which can be used to operate any of a number of applications. User devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art (except for transitory media like carrier waves or the like) such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, as noted above, computer-readable storage media does not include transitory media such as carrier waves or the like.

As described above, one aspect of the present technology obtains image data including headshot image data of one or more subjects of an image. The present disclosure contemplates that in some instances, this gathered data (referred to as personal information data) can uniquely identify or can be used to contact or locate a specific person. The present disclosure recognizes that the use of such data, in the present technology, can be used to the benefit of users. For example, the image data can be modified to provide a more professional looking image without requiring a professional photographer.

The present disclosure contemplates that the entities responsible for the collection, analysis, disclosure, transfer, storage, or other use of such data (e.g., image data or any suitable data derived from the image data) will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information data from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. Hence different privacy practices should be maintained for different personal data types in each country.

Despite the foregoing, the present disclosure also contemplates embodiments in which users selectively block the use of, collection of, or access to, image data. That is, the present disclosure contemplates that hardware and/or software elements can be provided to prevent or block access to such personal information data. For example, in some embodiments, the user may opt out of utilizing the image data adjustments discussed herein. In addition to providing "opt in" and "opt out" options, the present disclosure contemplates providing notifications relating to the access or use of personal information.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers, controlling the amount or specificity of data stored, controlling how data is stored, and/or other methods.

Therefore, although the present disclosure broadly covers use of personal information data to implement one or more various disclosed embodiments, the present disclosure also contemplates that the various embodiments can also be implemented without the need for accessing such personal information data.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims), are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise be read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
   obtaining, by a computing device, an input image;
   obtaining a plurality of landmark points form headshot image data corresponding to a subject depicted in the input image;
   generating, by the computing device, a plurality of source images, each source image of the plurality of source images corresponding to a color of a plurality of colors;
   generating, by the computing device, a plurality of target images by applying lighting adjustments to the plurality of source images based at least in part on the input image, wherein the lighting adjustments are applied to the plurality of source images based, at least in part, on the plurality of landmark points; and
   generating, by the computing device, a machine-learning model based at least in part on the plurality of source images and the plurality of target images, the machine-learning model being generated to identify subsequent lighting adjustments for subsequent input images.

2. The method of claim 1, further comprising storing the machine-learning model at the computing device, the storing of the machine-learning model at the computing device configuring the computing device to apply subsequent lighting adjustments associated to a subsequent image.

3. The method of claim 1, further comprising transforming the plurality of source images and the plurality of target images from screen space to 2-dimensional texture space, wherein the machine-learning model is generated utilizing a regression analysis technique and the plurality of source images and the plurality of target images transformed to 2-dimensional texture space.

4. The method of claim 1, wherein the machine-learning model corresponds to a virtual lighting mode of a plurality of virtual lighting modes, and wherein the method further comprises receiving user input indicating selection of the virtual lighting mode corresponding to the machine-learning model.

5. The method of claim 1, wherein the machine-learning model corresponds to a virtual lighting mode of a plurality of virtual lighting modes, and wherein the method further comprises:
   generating a second plurality of target images by applying different lighting adjustments corresponding to a second virtual lighting mode to the plurality of source images based at least in part on the input image;
   generating a second machine-learning model corresponding to the second virtual lighting mode of the plurality of virtual lighting modes based at least in part on the plurality of source images and the second plurality of target images, the machine-learning model being generated to identify subsequent lighting adjustments corresponding to the second virtual lighting mode for future input images.

6. The method of claim 5, further comprising:
storing the machine-learning model and the second machine-learning model at the computing device;
displaying, on a user interface of the computing device, an image and a plurality of selectable options corresponding to the plurality of virtual lighting modes;
receiving user input indicating selection of a particular selectable option of the plurality of selectable options, the particular selectable option corresponding to a particular virtual lighting mode of the plurality of virtual lighting modes;
modifying the image in real time utilizing the second machine-learning model rather than the machine-learning model based at least in part on the selection of the particular selectable option;
presenting, on a display of the computing device, the image as modified in real time.

7. A system, comprising:
a computing device comprising one or more memories configured to store computer-executable instructions and one or more processors configured to execute the computer-executable instructions to cause the computing device to at least:
obtain an input image;
obtaining a plurality of landmark points form headshot image data corresponding to a subject depicted in the input image;
generate a plurality of source images, each source image of the plurality of source images corresponding to a color of a plurality of colors;
generate a plurality of target images by applying lighting adjustments to the plurality of source images based at least in part on the input image, wherein the lighting adjustments are applied to the plurality of source images based, at least in part, on the plurality of landmark points; and
generate a machine-learning model based at least in part on the plurality of source images and the plurality of target images, the machine-learning model being generated to identify lighting adjustments to subsequent input images.

8. The system of claim 7, wherein the system further comprises a second computing device comprising at least one memory configured to store second computer-executable instructions and at least one processor configured to execute the second computer-executable instructions to cause the second computing device to:
receive a subsequent image depicting a subject; and
modify the subsequent image utilizing the machine-learning model.

9. The system of claim 8, wherein the instructions further cause the computing device to store the machine-learning model at the second computing device, wherein storing the machine-learning model at the second computing device configures the second computing device to modify subsequently obtained image in real time utilizing the machine-learning model.

10. The system of claim 8, wherein the second computer-executable instructions that modify the subsequent image utilizing the machine-learning model comprise further instructions that, when executed, cause the second computing device to:
generate a coordinate mapping texture based at least in part on the subsequent image;
transform pixel coordinates of the subsequent image from screen space to 2-dimensional texture space utilizing the coordinate mapping texture; and
providing, as input into the machine-learning model, pixel attributes and texel coordinates for a plurality of pixels of the subsequent image, wherein providing the input to the machine-learning model causes the machine-learning model to provide output identifying adjusted pixel attributes for each of the plurality of pixels of the subsequent image.

11. The system of claim 10, wherein the coordinate mapping texture is generated further based at least in part on a 3-dimensional mesh corresponding to a facial area of the subject of the subsequent image.

12. A computer-readable storage medium storing computer-executable instructions that, when executed by one or more processors, configure the one or more processors to perform operations comprising:
obtaining a machine-learning model that has been trained to identify lighting modifications for an input image according to a virtual lighting mode;
obtaining an image;
obtaining a plurality of landmark points form headshot image data corresponding to a subject depicted in the input image;
generating a coordinate mapping texture for the image; and
generating a modified version of the image based at least in part on the machine-learning model and the coordinate mapping texture for the image, the modified version of the image comprising lighting modifications to the image according to the virtual lighting mode and based, at least in part, on the plurality of landmark points.

13. The computer-readable storage medium of claim 12, wherein the machine-learning model is trained by:
obtaining a first input image;
generating a plurality of source images, each source image of the plurality of source images corresponding to a color of a plurality of colors;
generating a plurality of target images by applying lighting adjustments to the plurality of source images based at least in part on the first input image; and
training the machine-learning model based at least in part on the plurality of source images and the plurality of target images.

14. The computer-readable storage medium of claim 12, wherein the coordinate mapping texture for the image is generated based at least in part on image data associated with a portion of a subject of the image and a 3-dimensional mesh corresponding to the portion of the subject.

15. The computer-readable storage medium of claim 12, wherein the machine-learning model is associated with the virtual lighting mode, and wherein the operations further comprise receiving user input indicating a selection of the virtual lighting mode.

16. The computer-readable storage medium of claim 12, wherein the operations further comprise:
receiving a subsequent image associated with the image, the image and the subsequent image corresponding to frames of a video;
generating modified versions of the subsequent image utilizing the machine-learning model, the subsequent image being modified to apply the lighting modifications associated with the virtual lighting mode, and
presenting the modified versions of the image and the subsequent image in real time within a user interface.

17. The computer-readable storage medium of claim 12, wherein the operations further comprise transforming a set of pixel coordinates of the image from screen space to 2-dimensional texture space utilizing the coordinate mapping texture, wherein generating the modified version of the image is based at least in part on the machine-learning model and the set of pixel coordinates of the image as transformed to 2-dimensional texture space.

18. The computer-readable storage medium of claim 12, wherein the operations further comprise:
   providing, as input to the machine-learning model, texel coordinates and color values corresponding to a plurality of pixels of the image;
   receiving, as output from the machine-learning model, adjusted pixel attributes for the plurality of pixels of the image; and
   modifying the image based at least in part on the adjusted pixel attributes.

* * * * *

UNITED STATES PATENT AND TRADEMARK OFFICE
CERTIFICATE OF CORRECTION

PATENT NO. : 10,762,692 B2
APPLICATION NO. : 16/563335
DATED : September 1, 2020
INVENTOR(S) : Yury Degtyarev et al.

Page 1 of 1

It is certified that error appears in the above-identified patent and that said Letters Patent is hereby corrected as shown below:

In the Claims

Claim 1, at Column 30, Line 20 replace "form" with -- from --

Claim 7, at Column 31, Line 28 replace "form" with -- from --

Claim 12, at Column 32, Line 23 replace "form" with -- from --

Signed and Sealed this
Twentieth Day of October, 2020

Andrei Iancu
*Director of the United States Patent and Trademark Office*